(12) United States Patent
Manabe

(10) Patent No.: US 10,575,161 B2
(45) Date of Patent: Feb. 25, 2020

(54) COMMUNICATION SYSTEM AND SEMICONDUCTOR DEVICE

(71) Applicant: Renesas Electronics Corporation, Koutou-ku, Tokyo (JP)

(72) Inventor: Yasutake Manabe, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 120 days.

(21) Appl. No.: 15/851,144

(22) Filed: Dec. 21, 2017

(65) Prior Publication Data
US 2018/0262896 A1 Sep. 13, 2018

(30) Foreign Application Priority Data
Mar. 7, 2017 (JP) ................. 2017-042412

(51) Int. Cl.
| H04L 29/06 | (2006.01) |
| H04W 4/90 | (2018.01) |
| H04W 4/20 | (2018.01) |
| H04W 76/50 | (2018.01) |

(52) U.S. Cl.
CPC ............. *H04W 4/90* (2018.02); *H04W 4/20* (2013.01); *H04M 2242/04* (2013.01); *H04W 76/50* (2018.02)

(58) Field of Classification Search
CPC ..... H04L 45/74; H04L 67/12; H04L 29/0653; H04L 47/821; H04L 69/22; H04L 12/10; H04L 12/46; H04L 12/56; H04L 29/06; H04L 45/16; H04L 47/10; H04L 47/2433; H04L 47/6275
See application file for complete search history.

(56) References Cited

U.S. PATENT DOCUMENTS

| 2004/0143655 | A1* | 7/2004 | Narad ..................... H04L 45/16 709/223 |
| 2010/0202508 | A1* | 8/2010 | Karaoguz .......... H04N 21/2381 375/240.01 |
| 2012/0106448 | A1* | 5/2012 | Yousefi .................. H04N 7/183 370/328 |
| 2017/0126558 | A1* | 5/2017 | Kwon .................. H04N 21/234 |
| 2018/0295185 | A1* | 10/2018 | Kopetz .................. H04L 67/12 |

FOREIGN PATENT DOCUMENTS

JP 2006-067038 A 3/2006

\* cited by examiner

*Primary Examiner* — Sai Aung
(74) *Attorney, Agent, or Firm* — SGPatents PLLC

(57) ABSTRACT

Provided is a communication system capable of transmitting an emergency notification with a short delay without waiting until the completion of a current transmission of a frame or retransmitting the frame. The communication system includes a transmission device for generating a frame compliant with the Ethernet standard and transmitting the frame to the outside of the device, and a reception device for receiving the frame. The transmission device inserts emergency notification data into the frame at predetermined data intervals. The reception device acquires the emergency notification data from the received frame at the same data intervals as the transmission device, and acquires the remaining data as data (normal data) in a header region and payload region of the frame.

18 Claims, 30 Drawing Sheets

| | FLG | | | EDT_Fi | | | | |
|---|---|---|---|---|---|---|---|---|
| | BIT 7 | BIT 6 | BIT 5 | BIT 4 | BIT 3 | BIT 2 | BIT 1 | BIT 0 |
| VALUE C2 | 0 | | | | VALUE C1 | | | |
| VALUE D2 | 0 | | | | VALUE D1 | | | |
| VALUE D3 | 1 | | | | VALUE D1 | | | |
| EDT_Fx | | | | | | | | |

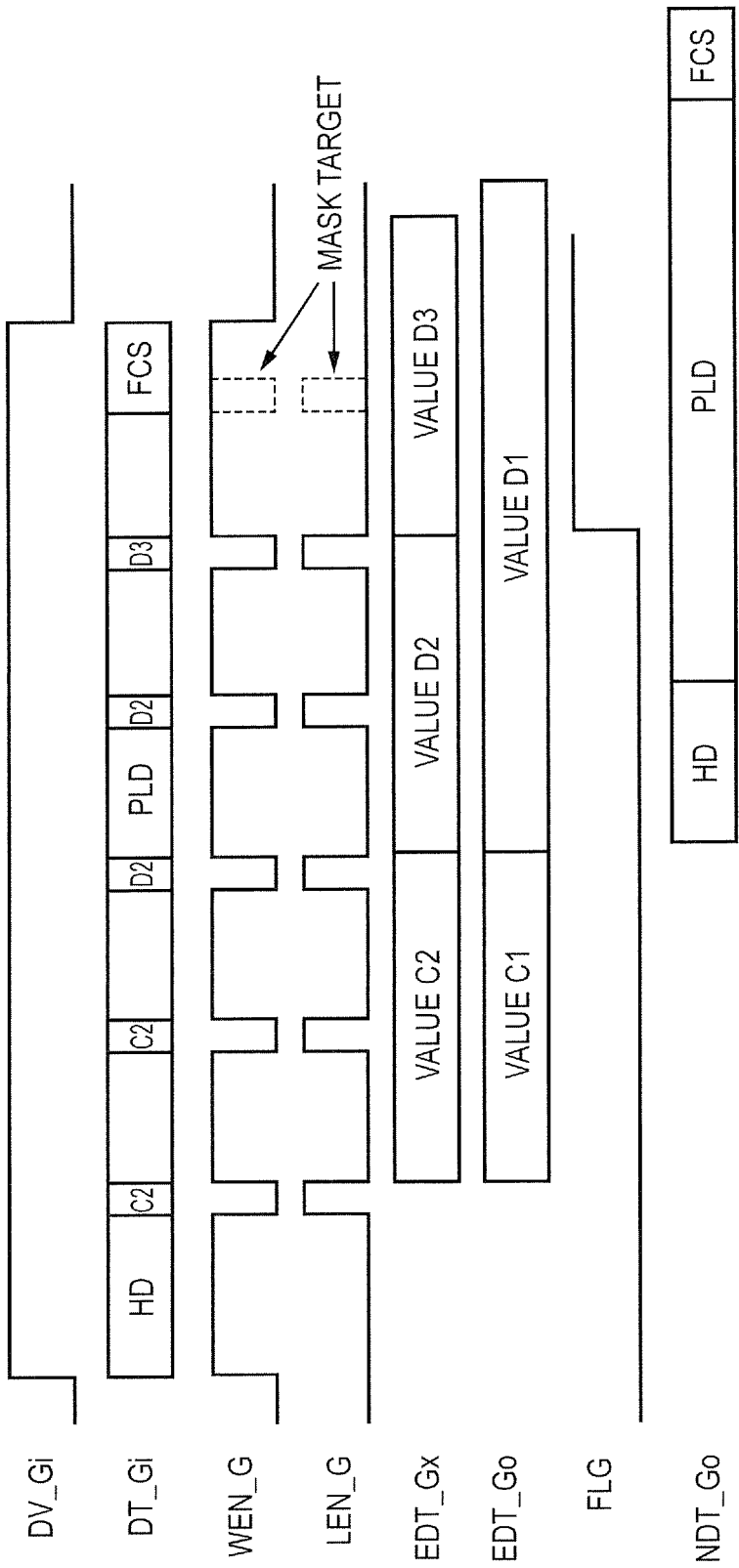

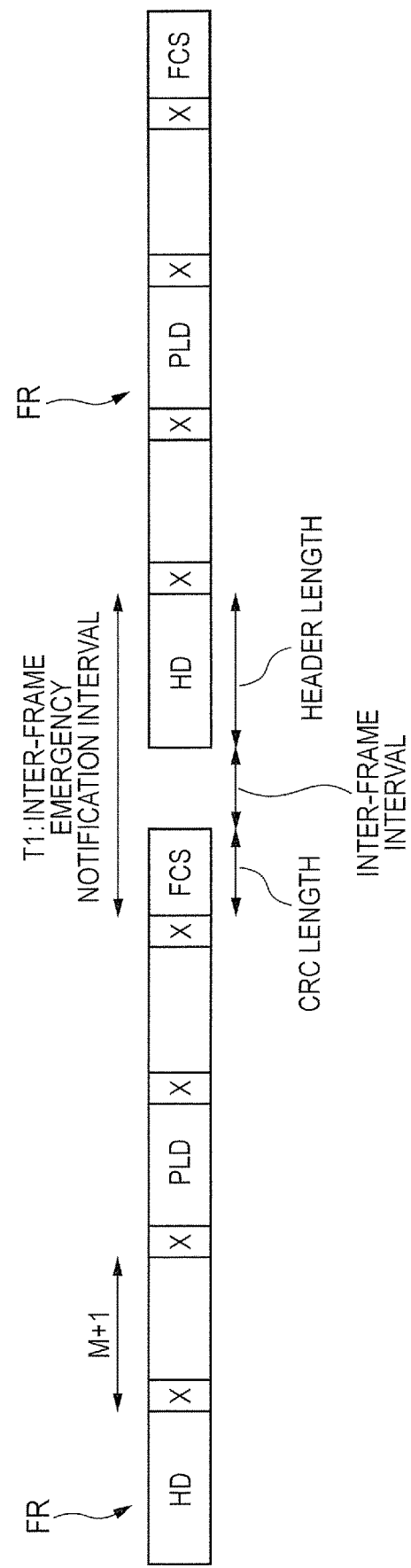

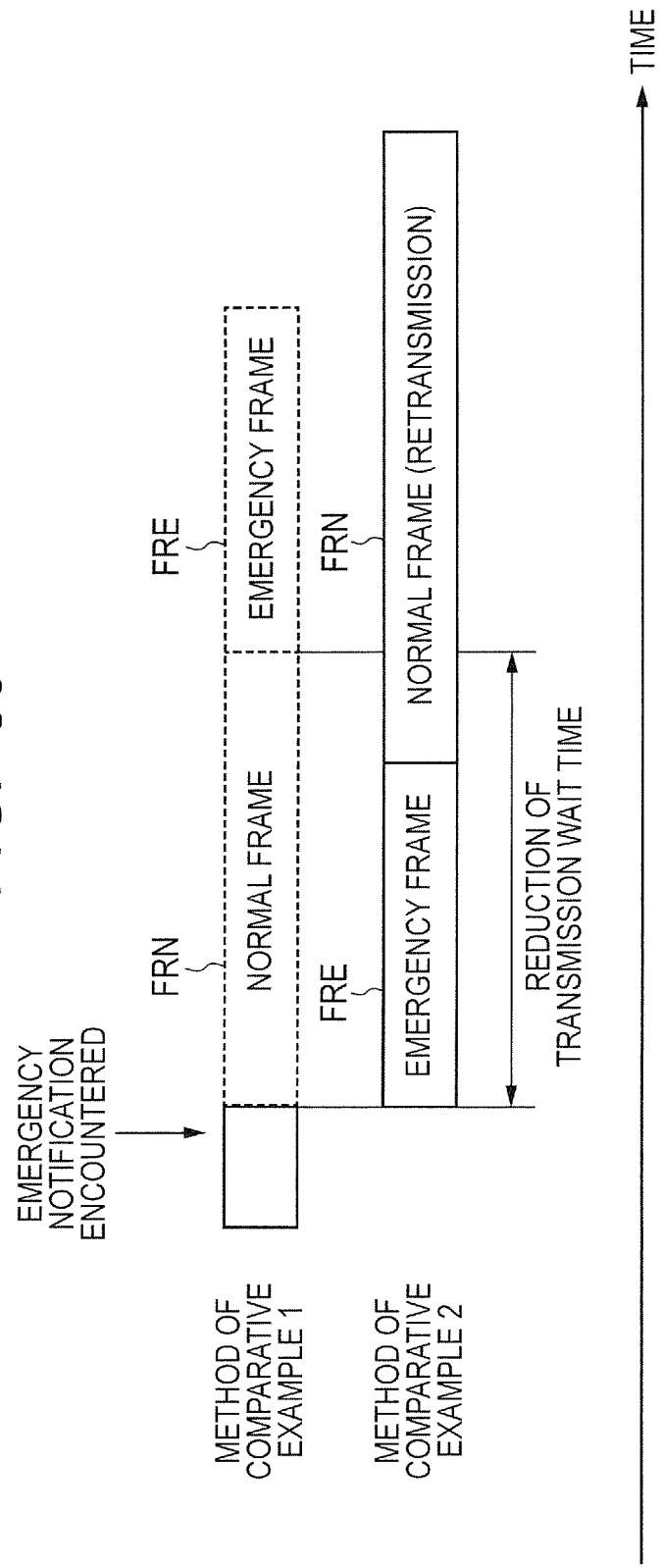

COMMUNICATION SYSTEM AND SEMICONDUCTOR DEVICE

CROSS-REFERENCE TO RELATED APPLICATIONS

The disclosure of Japanese Patent Application No. 2017-042412 filed on Mar. 7, 2017 including the specification, drawings, and abstract is incorporated herein by reference in its entirety.

BACKGROUND

The present invention relates to a communication system and to a semiconductor device. For example, the present invention relates to a technology for issuing an emergency notification with a frame compliant with the Ethernet (registered trademark) standard.

A technology described, for instance, in Japanese Unexamined Patent Application Publication No. 2006-67038 reduces a delay in the transmission of an emergency frame. If an emergency frame is encountered during the transmission of a normal frame, the currently transmitted normal frame is interrupted and discarded to transmit the emergency frame.

SUMMARY

If, for example, in Ethernet, an emergency notification needs to be transmitted while a frame is being transmitted, it is usually necessary to wait until the current transmission of the frame is completed. Therefore, a significant delay may occur when the emergency notification is to be transmitted. Meanwhile, using the technology described in Japanese Unexamined Patent Application Publication No. 2006-67038 makes it possible to transmit the emergency notification with a rather short delay. However, this technology makes it necessary to retransmit a normal frame that is discarded due to an emergency frame. Consequently, the normal frame might be transmitted, for example, with an increased delay.

In view of the above circumstances, later-described embodiments are contemplated. Other problems and novel features will become apparent from the following description and from the accompanying drawings.

According to an aspect of the present invention, there is provided a communication system including a transmission device and a reception device. The transmission device generates a frame compliant with the Ethernet standard and transmits the generated frame to the outside of the device. The reception device receives the frame. The transmission device inserts first data into the frame at predetermined data intervals. The reception device acquires the first data from the received frame at the same data intervals as the transmission device, and acquires the remaining data as data in the header region and payload region of the frame.

The above aspect of the present invention makes it possible to transmit an emergency notification with a short delay without waiting until the completion of a current transmission of a frame or retransmitting the frame.

BRIEF DESCRIPTION OF THE DRAWINGS

FIG. 28 is a waveform diagram illustrating an exemplary operation of the reception circuit shown in FIG. 25;

FIG. 29 is a diagram illustrating an exemplary method of determining an interval setting in the communication system according to a seventh embodiment of the present invention; and FIG. 30 is a schematic diagram illustrating an emergency notification transmission method as a comparative example for the present invention.

DETAILED DESCRIPTION

Figure 1:
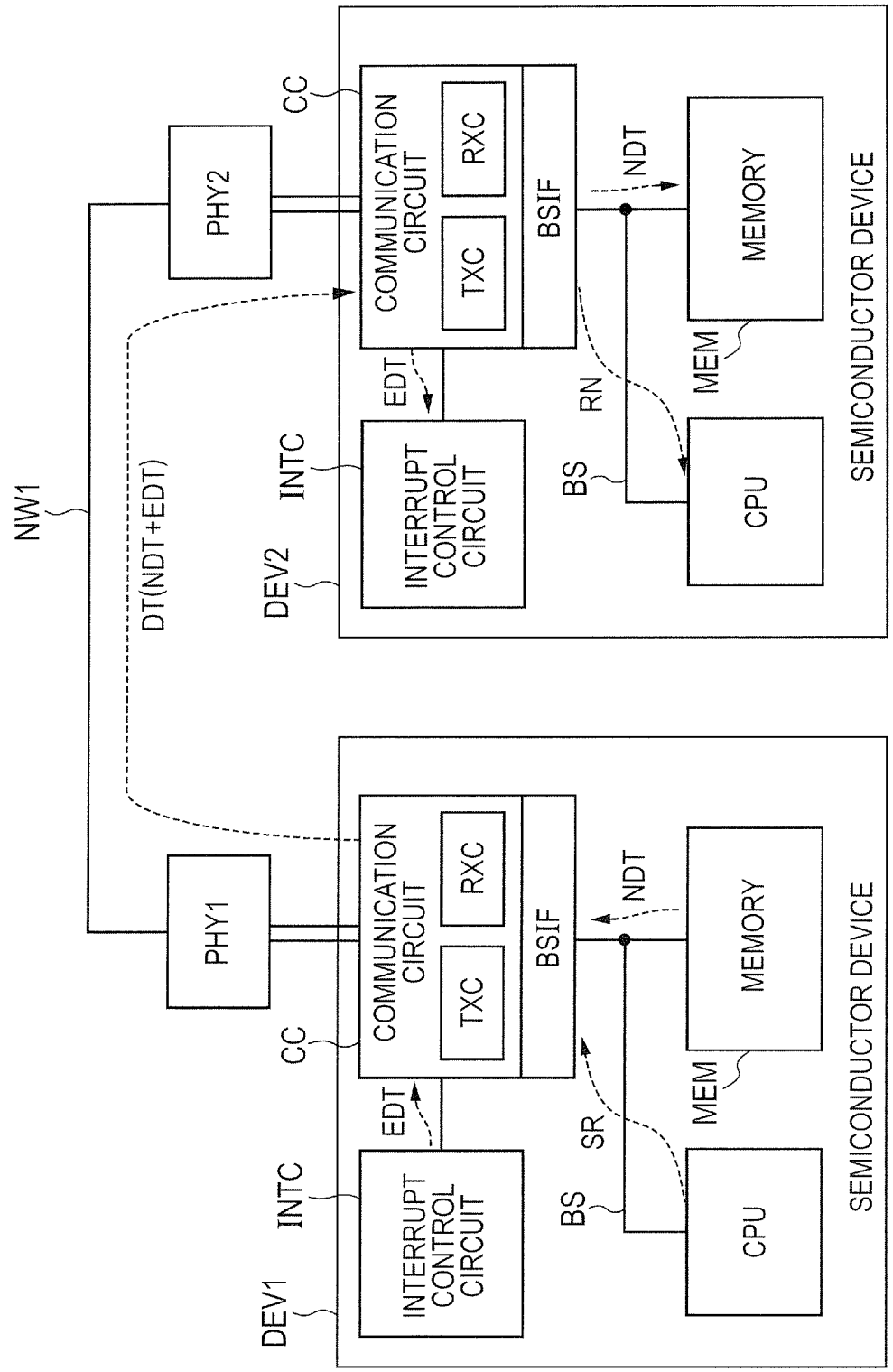
FIG. 1 is a schematic diagram illustrating an exemplary configuration of main parts of a communication system according to a first embodiment of the present invention.

In the following description of embodiments, if necessary for convenience sake, a description of the present invention will be divided into a plurality of sections or embodiments, but unless specifically stated, they are not unrelated to each other, but are in such a relation that one is, for example, a modification, a detailed explanation, or a supplementary explanation of a part or the whole of the other. Also, in the embodiments described below, when the number of elements (including the number of pieces, numeric values, amounts, ranges, etc.) is mentioned, the number of elements is not limited to a specific number unless, for example, specifically stated or apparently limited to a specific number in principle. The number larger or smaller than the specific number is also applicable.

Further, in the embodiments described below, it is obvious that the components (including, for example, element steps) are not always indispensable unless, for example, specifically stated or apparently indispensable in principle. Similarly, in the embodiments described below, when, for example, the shape of the components and the positional relationship therebetween are mentioned, for example, the substantially approximate or similar shapes are included therein unless, for example, they are specifically stated or can be apparently excluded in principle. The same goes for the aforementioned numeric values and ranges.

Moreover, circuit elements included in each functional block of the embodiments are not limited in particular, but are formed over a semiconductor substrate of single crystal silicon or the like by using a known integrated circuit technology for a CMOS transistor (complementary MOS transistor) or the like.

Embodiments of the present invention will now be described in detail with reference to the accompanying drawings. In all the drawings depicting the embodiments, like elements are generally designated by like reference numerals. Such like elements will not be redundantly described.

First Embodiment

<<Emergency Notification Transmission Method (Comparative Example) and Its Problem>>

First of all, a comparative example method will be described before the explanation of an embodiment-based method. FIG. 30 is a schematic diagram illustrating an emergency notification transmission method as a comparative example for the present invention. When an emergency notification needs to be transmitted, an emergency frame FRE containing emergency notification information is usually transmitted after a currently transmitted normal frame FRN is completely transmitted, as indicated in comparative example 1 of FIG. 30. In this instance, however, it is difficult to transmit the emergency notification with a short delay because it is necessary to wait until the transmission of the normal frame FRN is completed. In an in-vehicle communication system, for example, an emergency notification needs to be transmitted in a certain case in order to present, for example, failure information about control equipment while an image captured by a camera is being transmitted. In such a system where safety requirements are high, in particular, it is demanded that an emergency notification be transmitted, for example, to a predetermined error processing section as soon as possible.

In view of the above circumstances, a method indicated as comparative example 2 of FIG. 30 may be contemplated. This method discards a currently transmitted normal frame FRN before it is completed transmitted, transmits an emergency frame FRE instead, and then retransmits the discarded normal frame FRN. In this case, however, communication efficiency may decrease. More specifically, the retransmission of the normal frame FRN may cause, for example, an increased delay in the transmission of the normal frame FRN and an increase in bandwidth overhead. Further, when one emergency frame FRE is used to transmit an emergency notification formed of a small amount of data (e.g., several bytes), padding needs to be performed to meet minimum frame size (64-byte) requirements. As a result, for example, the bandwidth overhead may increase due to padding.

<<Overview of Communication System>>

FIG. 1 is a schematic diagram illustrating an exemplary configuration of main parts of a communication system according to a first embodiment of the present invention. The communication system shown in FIG. 1 includes two semiconductor devices (semiconductor chips) DEV1, DEV2, PHY (PHYsical layer) circuits PHY1, PHY2, and a network NW1. The PHY circuits PHY1, PHY2 are respectively coupled to the semiconductor devices DEV1, DEV2. The network NW1 couples the PHY circuits PHY, PH2 together. The network NW1 is a wired network formed, for example, of Ethernet cables or a wireless LAN network compliant, for example, with IEEE 802.11.

The semiconductor devices DEV1, DEV2 each include a CPU (Central Processing Unit), a memory MEM, an interrupt control circuit INTC, a communication circuit CC, and a bus interface BSIF for the communication circuit CC. The CPU, the memory MEM, and the bus interface BSIF are coupled with a bus BS.

The communication circuit CC includes a transmission circuit TXC and a reception circuit RXC. The transmission circuit TXC generates a frame compliant with the Ethernet standard and transmits the generated frame to the outside of the device. The reception circuit RXC receives a frame from the outside of the device. In the present example, the communication circuit CC processes a MAC (Media Access Control) layer, and transmits and receives frames through the PHY circuits PHY1, PHY2, which process a PHY (Physical) layer.

The PHY circuits PHY1, PHY2 each include, for example, a circuit for performing conversion between a serial signal and a parallel signal. Typically, a known circuit such as a circuit compliant with the IEEE 802. 3 MII (Media Independent Interface) standard or a circuit compliant with the GMII (Gigabit Media Independent Interface) standard may be included. The PHY circuits PHY1, PHY2 are often formed of a semiconductor chip alone. In some cases, however, the PHY circuits PHY1, PHY2 may be incorporated in the communication circuit CC.

The CPU (and the memory MEM) is a generation source or receiving destination of normal data NDT. The interrupt control circuit INTC is a generation source or receiving destination of emergency notification data EDT. The emergency notification data EDT is higher in emergency (or in priority) than the normal data NDT. In the present example, the communication circuit CC transmits and receives the normal data NDT through the bus interface BSIF, and directly transmits and receives the emergency notification data EDT.

Generally, the emergency notification data EDT is often transmitted and received during an interrupt process. Therefore, the interrupt control circuit INTC acts as a generation source or a receiving destination. However, the generation source or reception destination of the emergency notification data EDT can be changed as needed. Further, the generation source or reception destination of the normal data NT can also be changed as needed. That is to say, the communication circuit CC may be configured so that at least the normal data NDT and the emergency notification data EDT can be distinctively transmitted to and received from various internal circuits.

Figure 2:
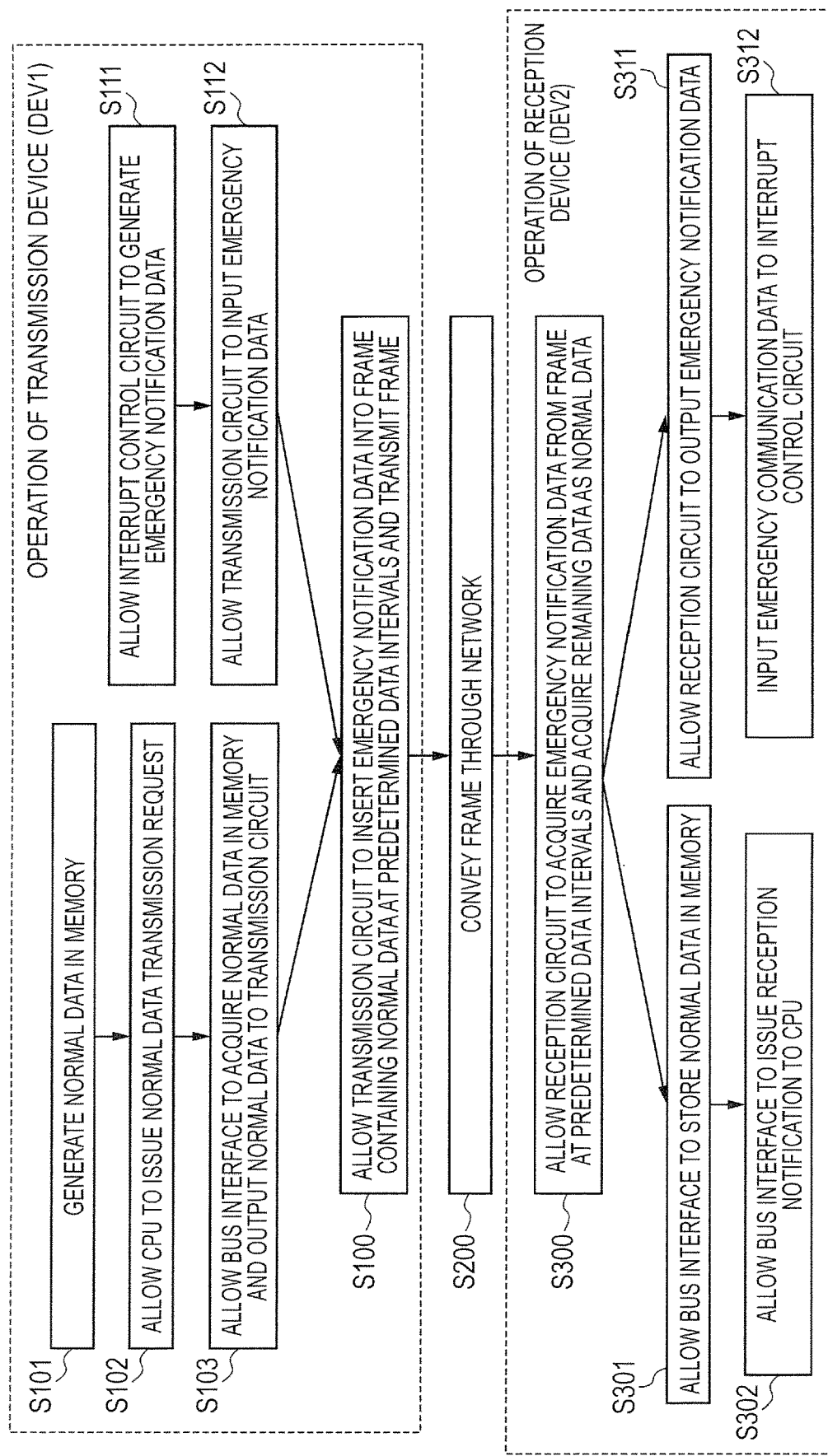
FIG. 2 is a flowchart illustrating an outline of an exemplary operation of the communication system shown in FIG. 1.

FIG. 2 is a flowchart illustrating an outline of an exemplary operation of the communication system shown in FIG. 1. Here, it is assumed that the semiconductor device DEV1 is the transmission source of a frame (i.e., transmission device), and that the semiconductor device DEV2 is the reception destination of the frame (i.e., reception device. Referring to FIG. 2, first of all, the semiconductor device DEV1 generates normal data NDT in the memory MEM (step S101. The normal data NDT may be, for example, generated by the CPU or partly generated, for example, by a DMAC (Direct Memory Access Controller. The normal data NDT includes, for example, data in the header region and payload region of a frame.

Upon completion of generation of normal data NDT, the CPU performs various setup operations for the setup registers of the bus interface BSIF and communication circuit CC, and issues a transmission request SR for the normal data NDT to the bus interface BSIF (step S102). In response to the transmission request SR, the bus interface BSIF acquires the normal data NDT from the memory MEM in accordance with the contents of the setup register, and outputs the acquired normal data NDT to the transmission circuit TXC (step S103).

Meanwhile, independently of processing in steps S101 to S103, the interrupt control circuit INTC generates emergency notification data EDT and outputs the generated emergency notification data EDT to the transmission circuit TXC (steps S111 and S112). Here, the transmission circuit TXC generates a frame (frame data DT) containing the normal data NDT inputted in step S103, and inserts, during such a process, the emergency notification data EDT, which is inputted in step S112, into the frame (frame data DT) at predetermined data intervals (step S100). The transmission circuit TXC then transmits the frame, into which the emergency notification data EDT is periodically inserted, to the network NW1 through the PHY circuit PHY1 (step S100).

The network NW1 receives the frame from the transmission circuit TXC and transmits the received frame to the semiconductor device DEV2 through the PHY circuit PHY2 (step S200). The reception circuit RXC in the semiconductor device DEV2 receives the frame (frame data DT) and acquires the emergency notification data EDT from the received frame at the same data intervals as the transmission circuit TXC in the aforementioned semiconductor device DEV1 (step S300). Further, the reception circuit RXC acquires the remaining data as the normal data NDT (i.e., the data in the header region and payload region of the frame) (step S300).

The bus interface BSIF stores the normal data NDT acquired in step S300 in the memory MEM (step S301, and then issues a reception notification RN to the CPU (step S302). Further, in parallel with the processing in steps S301 and S302, the reception circuit RXC outputs the emergency notification data EDT acquired in step S300 to the interrupt control circuit INTC (steps S311 and S312).

<<Details of Main Parts of Transmission Circuit>>

Figure 3:
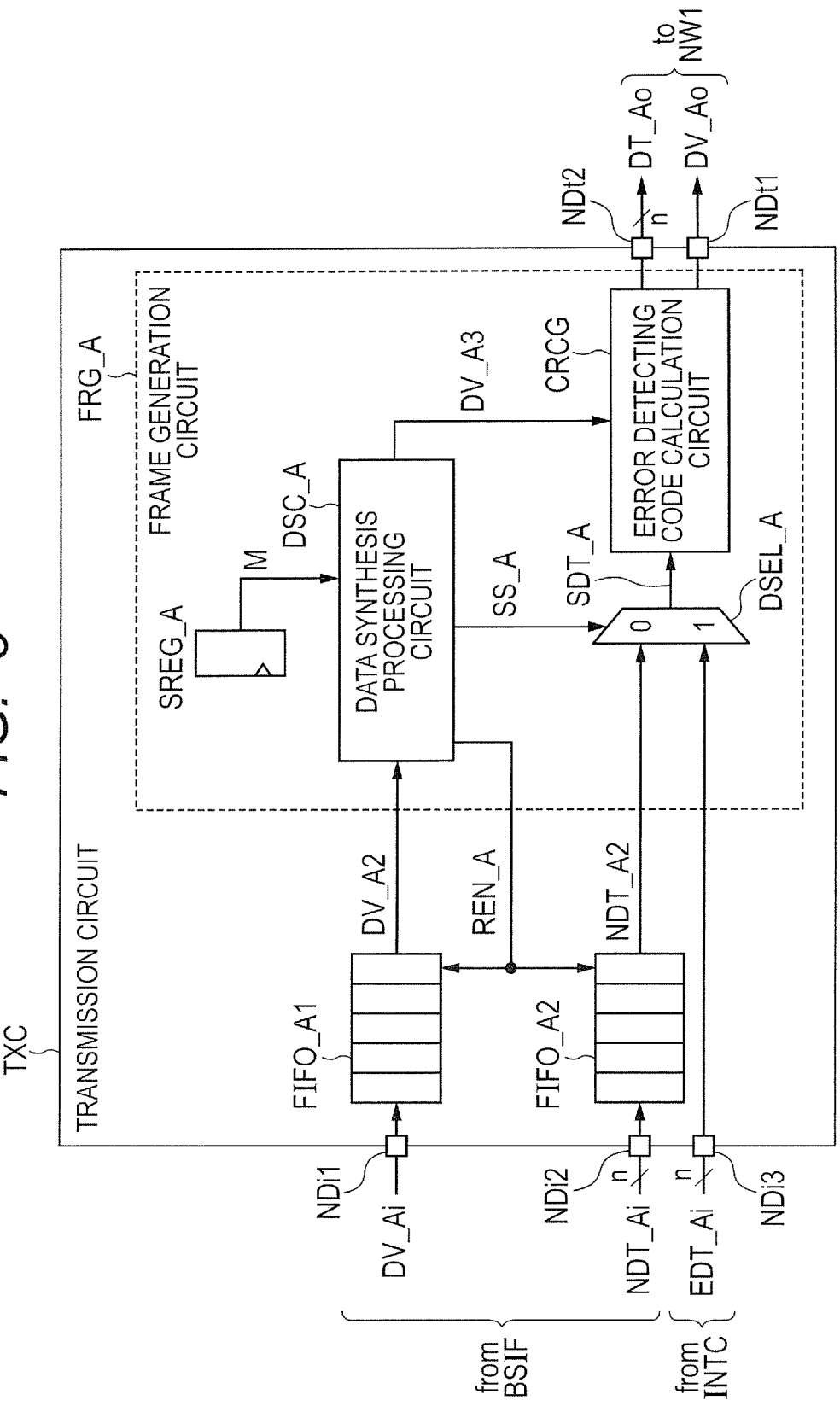
FIG. 3 is a circuit block diagram illustrating an exemplary configuration of main parts of a transmission circuit in a semiconductor device shown in FIG. 1.
Figure 4:
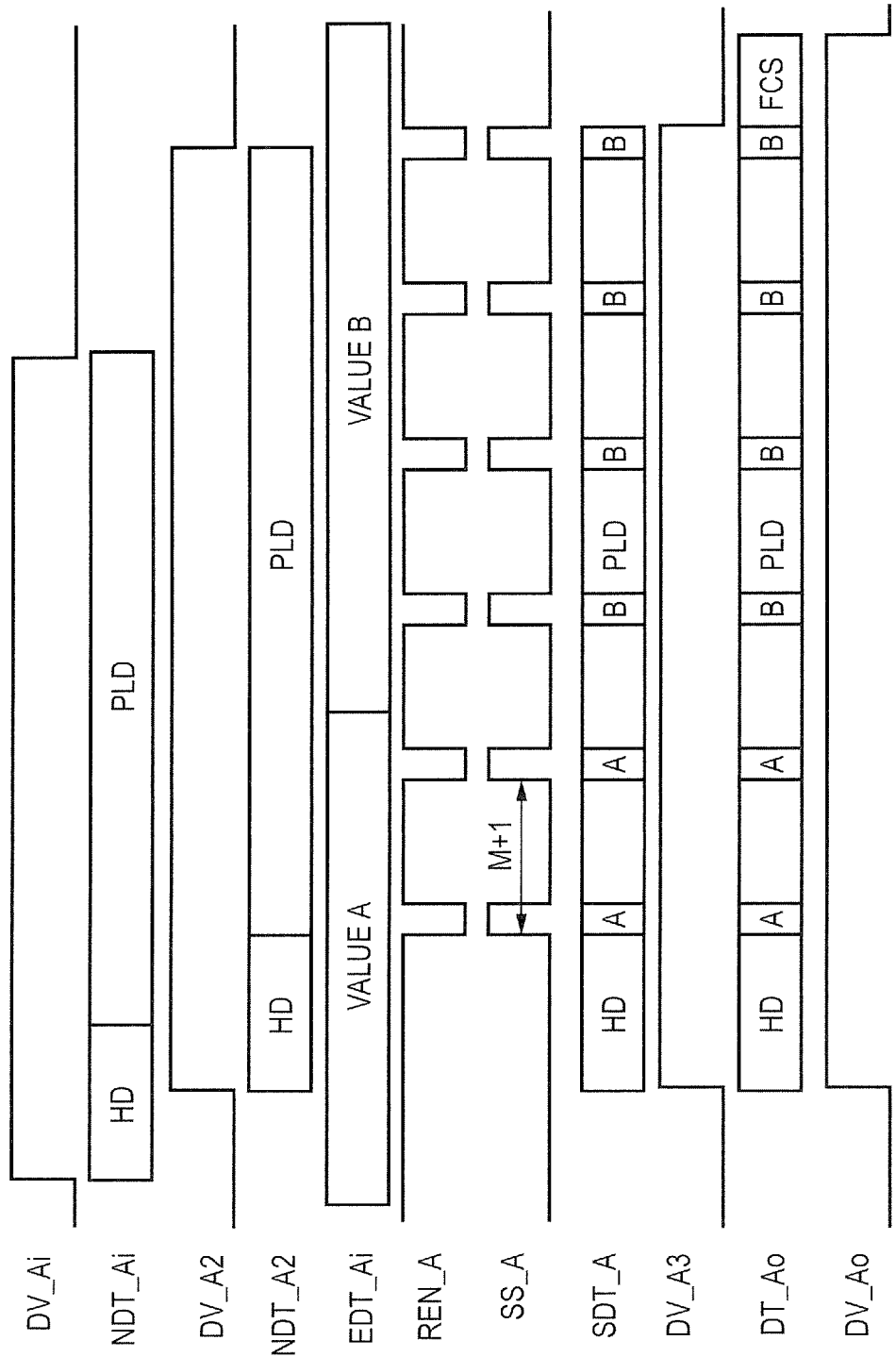
FIG. 4 is a waveform diagram illustrating an exemplary operation of the transmission circuit shown in FIG. 3.

FIG. 3 is a circuit block diagram illustrating an exemplary configuration of main parts of the transmission circuit in the semiconductor device shown in FIG. 1. FIG. 4 is a waveform diagram illustrating an exemplary operation of the transmission circuit shown in FIG. 3. The transmission circuit TXC shown in FIG. 3 includes a data valid input node NDi1, a normal data input node NDi2, an emergency notification data input node NDi3, a data valid transmission node NDt1, a frame data transmission node NDt2, FIFO (First In First Out) buffers FIFO_A1, FIFO_A2, and a frame generation circuit FRG_A. The transmission TXC transmits a frame in synchronism with a transmission clock cycle and performs various processes required for transmission.

A data valid signal DV_Ai is inputted from the bus interface BSIF to the data valid input node NDi1, and normal data NDT_Ai is inputted from the bus interface BSIF to the normal data input node NDi2. Emergency notification data EDT_Ai is inputted from the interrupt control circuit INTC to the emergency notification data input node NDi3. The normal data NDT_Ai and the emergency notification data EDT_Ai both have a bit width of n bits (e.g., 4 or 8 bits.

More specifically, as illustrated in FIG. 4, the normal data NDT_Ai (i.e., data in the header region HD and in the payload region PLD) is inputted to the normal data input node NDi2 during a predetermined validity period, and data related to an idle state is inputted during a period (blank in FIG. 4) other than the validity period. Meanwhile, the data valid signal DV_Ai, which is at the "1" level during the validity period and at the "0" level during a period other than the validity period, is inputted to the data valid input node NDi1. When the normal data NDT_Ai in the memory MEM is to be outputted to the transmission circuit TXC, the bus interface BSIF generates and outputs such a data valid signal DV_Ai.

The FIFO buffer FIFO_A2 retains the normal data NDT_Ai that is to be stored in the header region HD and payload region PLD of a frame. More specifically, the FIFO buffer FIFO_A2 has a capacity for a predetermined number of transmission clock cycles, and acquires data at the normal data input node NDi2 (including the normal data NDT_Ai in the validity period) on every transmission clock cycle. Meanwhile, FIFO buffer FIFO_A1 has a capacity for the same number of transmission clock cycles as the FIFO buffer FIFO_A2, and acquires the data valid signal DV_Ai at the data valid input node NDi1 on every transmission clock cycle.

The frame generation circuit FRG_A includes an interval setting register SREG_A, a data synthesis processing circuit DSC_A, a data selection circuit DSEL_A, and an error detecting code calculation circuit CRCG, and chronologically generates frames while sequentially determining frame data on every transmission clock cycle. The interval setting register SREG_A retains an interval setting M that is set, for example, by the CPU shown in FIG. 1. The interval setting M is a value that determines the data intervals at which the emergency notification data EDT_Ai is periodically inserted.

The data synthesis processing circuit DSC_A includes a data counter, which is will be described later in detail. The data counter cyclically counts the number of transmission clock cycles at intervals defined by the interval setting M (cycle count "M+1". As illustrated in FIG. 4, the data synthesis processing circuit DSC_A exercises control based on the count of the data counter to set a selection signal SS_A of the data selection circuit DSEL_A at the "1" level at each cycle count "M+1". More specifically, the data synthesis processing circuit DSC_A exercises control so as to set the selection signal SS_A at the "1" level when the count of the data counter is a predetermined value and at the "0" level when the counter of the data counter is a value other than the predetermined value. Further, the data synthesis processing circuit DSC_A controls the read enable signal REN_A for the FIFO buffers FIFO_A1, FIFO_A2 in a complementary relation to the selection signal SS_A.

The FIFO buffers FIFO_A1, FIFO_A2 perform a read operation when the read enable signal REN_A is at the "1" level (i.e., the selection signal SS_A is at the "0" level. Due to the read operation, the FIFO buffer FIFO_A1 outputs a data valid signal DV_A2, and the FIFO buffer FIFO_A2 outputs normal data NDT_A2. As a result, as illustrated in FIG. 4, the validity period of the normal data NDT_A2 and the "1"-level period of the data valid signal DV_A2 are made longer than the validity period of the normal data NDT_Ai and the "1"-level period of the data valid signal DV_Ai by a generated "0"-level period of the read enable signal REN_A.

The data selection circuit DSEL_A selects the normal data NDT_A2 when the selection signal SS_A is at the "0" level (the read enable signal REN_A is at the "1" level, and selects the emergency notification data EDT_Ai when the selection signal SS_A is at the "1" level (the read enable signal REN_A is at the "0" level. Then, as illustrated in FIG. 4, the data selection circuit DSEL_A outputs the selected data as selected data SDT_A.

That is to say, if the count of the data counter is the predetermined value, the data selection circuit DSEL_A determines the selected data SDT_A as the emergency notification data EDT_Ai in a state where the FIFO buffers FIFO_A1, FIFO_A2 are not read. If, by contrast, the count of the data counter is a value other than the predetermined value, the data selection circuit DSEL_A determines the selected data SDT_A as the normal data NDT_A2 from the FIFO buffer FIFO_A2 in a state where the FIFO buffers FIFO_A1, FIFO_A2 are read. As illustrated in FIG. 4, the selected data SDT_A is used as data DT_Ao) of a frame that is to be finally outputted.

Further, as illustrated in FIG. 4, the data synthesis processing circuit DSC_A generates a data valid signal DV_A3 for the validity period of the selected data SDT_A. The error detecting code calculation circuit CRCG calculates an error detecting code (or more specifically, a CRC (Cyclic Redundancy Check) code)) for the selected data SDT_A outputted from the data selection circuit DSEL_A. As illustrated in FIG. 4, the error detecting code calculation circuit CRCG generates frame data DT_Ao by adding an error detecting code region FCS to the tail end of the selected data SDT_A and storing the calculated value in the error detecting code region FCS, and transmits the frame data DT_Ao from the frame data transmission node NDt2. Further, the error detecting code calculation circuit CRCG generates a data valid signal DV_Ao by extending the data valid signal DV_A3 by the amount of addition of the error detecting code, and transmits the data valid signal DV_Ao from the data valid transmission node NDt1.

Referring now to FIG. 4, the interrupt control circuit INTC shown in FIG. 1 transmits, as the emergency notification data EDT_Ai, for example, a value A indicating that no emergency notification exists under normal conditions, and transmits a value B when an emergency notification arises. The value B indicative of an emergency notification is inserted into a frame in accordance with the "1"-level period of an immediately following selection signal SS_A. Therefore, the emergency notification can be transmitted with a short delay. That is to say, an emergency notification delay time can be guaranteed based on the value of the interval setting M. If, for example, a 1-byte emergency notification is inserted at 20-byte intervals, the transmission of the emergency notification can be started with a delay of no longer than 20-byte time (1.6 microseconds at a communication speed of 100 Mbps).

Further, in the example of FIG. 4, the data in the header region HD is maintained as usual when the emergency notification data EDT_Ai is inserted into the payload region PLD of a frame. Furthermore, a correct error detecting code is determined for the whole frame in which normal data and emergency notification data coexist when the error detecting code is calculated for the selected data SDT_A. As a result of these operations, even if, for example, a regular Ethernet switch exists in the network NW1 shown in FIG. 1, the versatility of Ethernet communication can be maintained without causing any particular problem.

<<Details of Data Synthesis Processing Circuit>>

Figure 5:
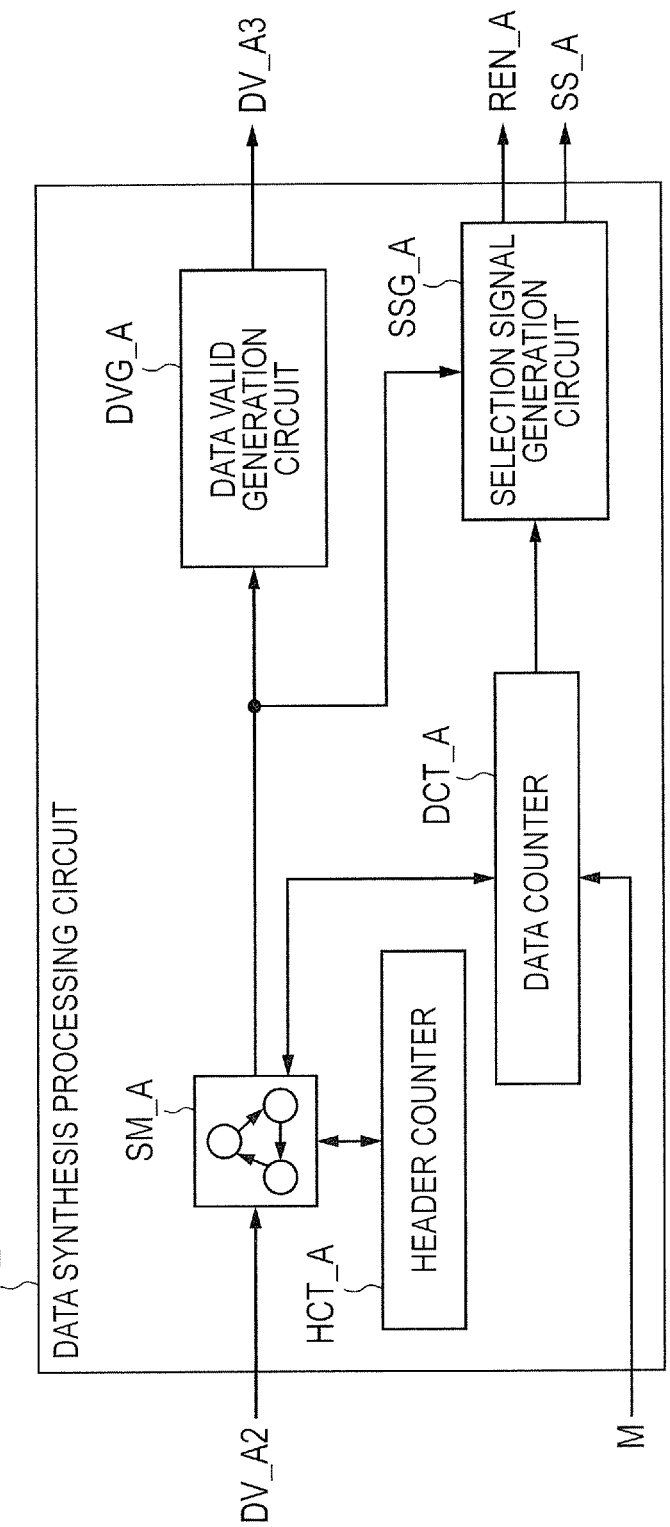
FIG. 5 is a circuit block diagram illustrating an exemplary configuration of a data synthesis processing circuit shown in FIG. 3.
Figure 6:
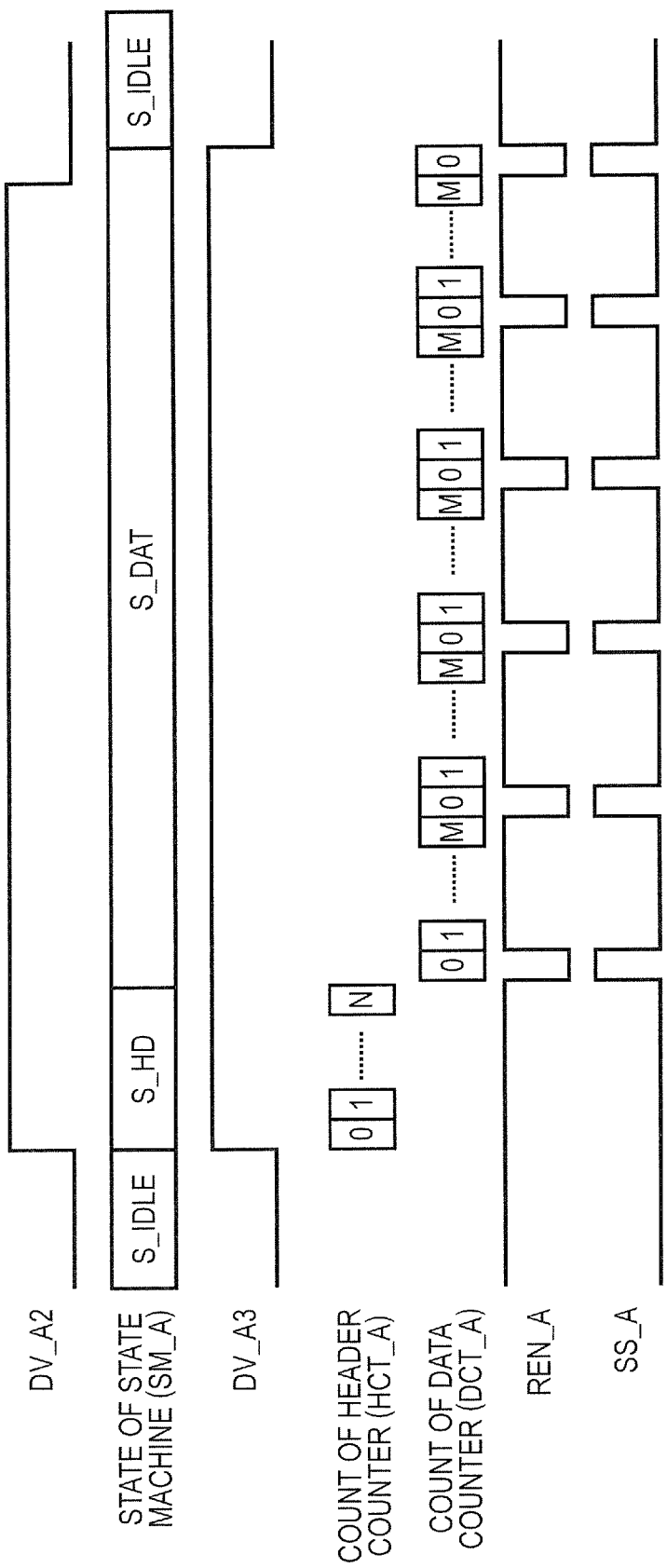
FIG. 6 is a waveform diagram illustrating an exemplary operation of the data synthesis processing circuit shown in FIG. 5.

FIG. 5 is a circuit block diagram illustrating an exemplary configuration of the data synthesis processing circuit shown in FIG. 3. FIG. 6 is a waveform diagram illustrating an exemplary operation of the data synthesis processing circuit shown in FIG. 5. The data synthesis processing circuit DSC_A shown in FIG. 5 includes a header counter HCT_A, a data counter DCT_A, a state machine SM_A, a data valid generation circuit DVG_A, and a selection signal generation circuit SSG_A.

As illustrated in FIG. 6, the state machine SM_A shifts between three different states, namely, an idle state S_IDLE, a header state S_HD, and a data state S_DAT. When the data valid signal DV_A2 changes from the "0" level to the "1" level, the state machine SM_A transitions from the idle state S_IDLE to the header state S_HD. In response to the transition to the header state S_HD, the header counter HCT_A starts a counting operation, and counts the number of transmission clock cycles "N+1" based on a known data length of the header region HD. When the counting operation of the header counter HCT_A is completed, the state machine SM_A transitions from the header state S_HD to the data state S_DAT.

In response to the transition to the data state S_DAT, the data counter DCT_A starts a counting operation and cyclically counts the number of transmission clock cycles at intervals defined by the cycle count "M+1". The selection signal generation circuit SSG_A exercises control so as to set the read enable signal REN_A at the "0" level if the data state S_DAT prevails and the count of the data counter DCT_A is "0", and exercises control so as to set the read enable signal REN_A at the "1" level in other circumstances.

Further, the selection signal generation circuit SSG_A outputs an inversion of the read enable signal REN_A as the selection signal SS_A. That is to say, control is exercised so as to set the selection signal SS_A at the "1" level when the count of the data counter DCT_A is "0" and at the "0" level when the count is a value other than "0". While performing no counting operation, the data counter DCT_A outputs a value (e.g., "M") that sets the read enable signal REN_A at the "1" level (sets the selection signal SS_A at the "0" level).

If the data valid signal DV_A2 is at the "0" level (condition A) and the count of the data counter DCT_A is a value other than "0" (condition B) (i.e., the read enable signal REN_A is at the "1" level), the state machine SM_A transitions from the data state S_DAT to the idle state S_IDLE. In response to the transition to the idle state S_IDLE, the data counter DCT_A terminates the counting operation.

As illustrated in FIGS. 4 and 6, the above-mentioned condition B is a condition under which if a transmission clock cycle subsequent to the termination of processing of the payload region PLD coincides with an insertion cycle of the emergency notification data EDT_Ai, the emergency notification data EDT_Ai is inserted on such a cycle. Consequently, even if an emergency notification arises, for example, at a time point immediately before the termination of processing of the payload region PLD, the emergency notification can be reflected in a currently processed frame.

As illustrated in FIG. 6, the data valid generation circuit DVG_A exercises control so as to keep the data valid signal DV_A3 at the "1" level during a period of the header state S_HD and a period of the data state S_DAT. The "1"-level period of the data valid signal DV_A3 is equal to the "1"-level period of the data valid signal DV_A2 if the above-mentioned condition B does not arise. However, if the above-mentioned condition B arises, the "1"-level period of the data valid signal DV_A3 is longer by one cycle than the "1"-level period of the data valid signal DV_A2.

When the transmission circuit TXC is formed of the FIFO buffers FIFO_A1, FIFO_A2 in FIG. 3, the counters (HCT_A, DCT_A) in FIG. 5, and the state machine SM_A as described above, the emergency notification data can be inserted into a frame by employing a simple configuration and a simple operation scheme. Referring to FIG. 6, when the count of the data counter DCT_A is "0", the emergency notification data is inserted. However, the count of the data counter DCT_A is not always limited to "0". Nevertheless, from the viewpoint of transmitting the emergency notification as early as possible and enlarging the range of the interval setting M, the count of the data counter DCT_A is preferably "0". If, for instance, the count is "7", the time point at which an emergency notification in a frame is initially transmitted is delayed by 7 cycles from a case where the count is "0", and the minimum value of the interval setting M is limited to "7" or greater.

<<Details of Main Parts of Reception Circuit>>

Figure 7:
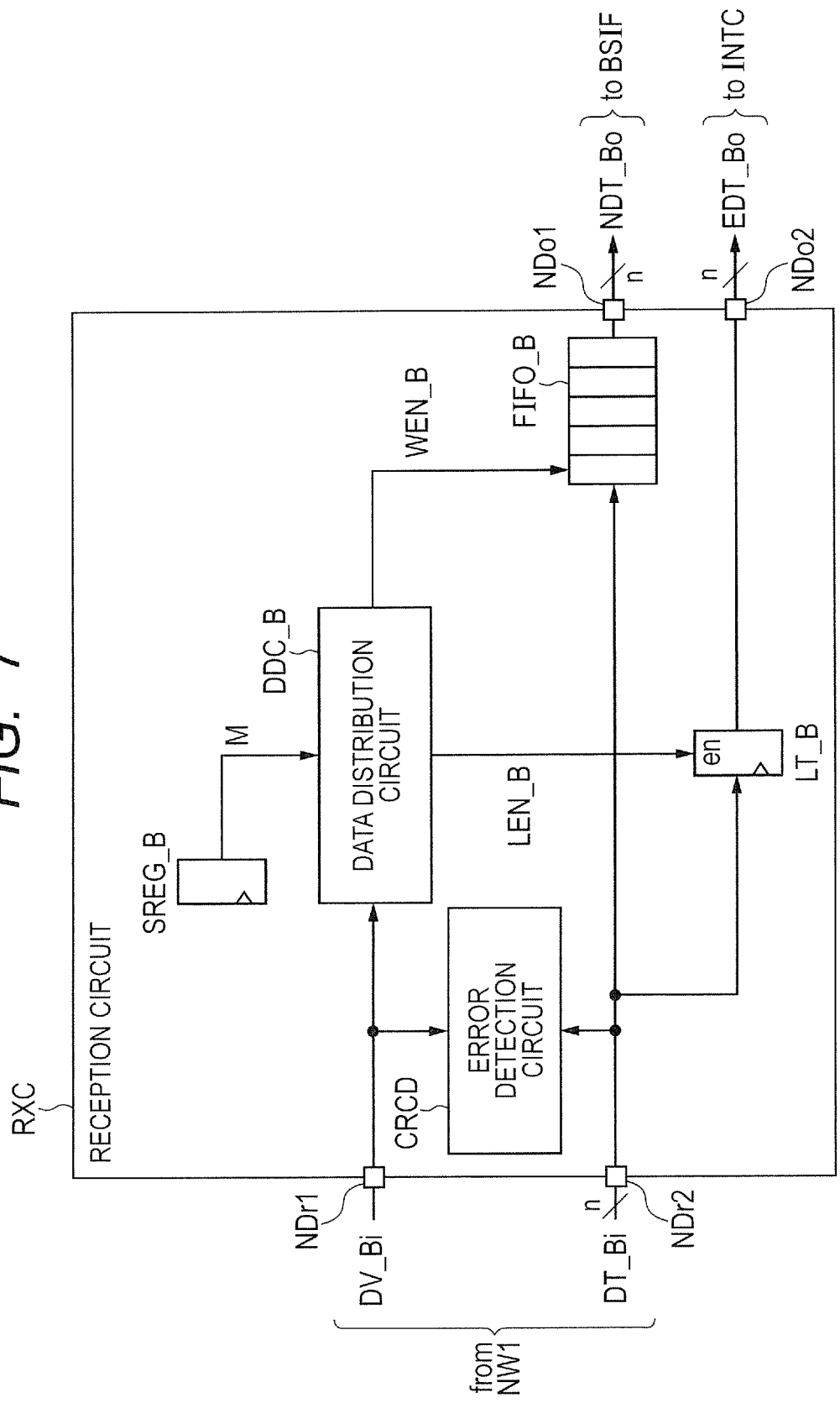
FIG. 7 is a circuit block diagram illustrating an exemplary configuration of main parts of a reception circuit in the semiconductor device shown in FIG. 1.
Figure 8:
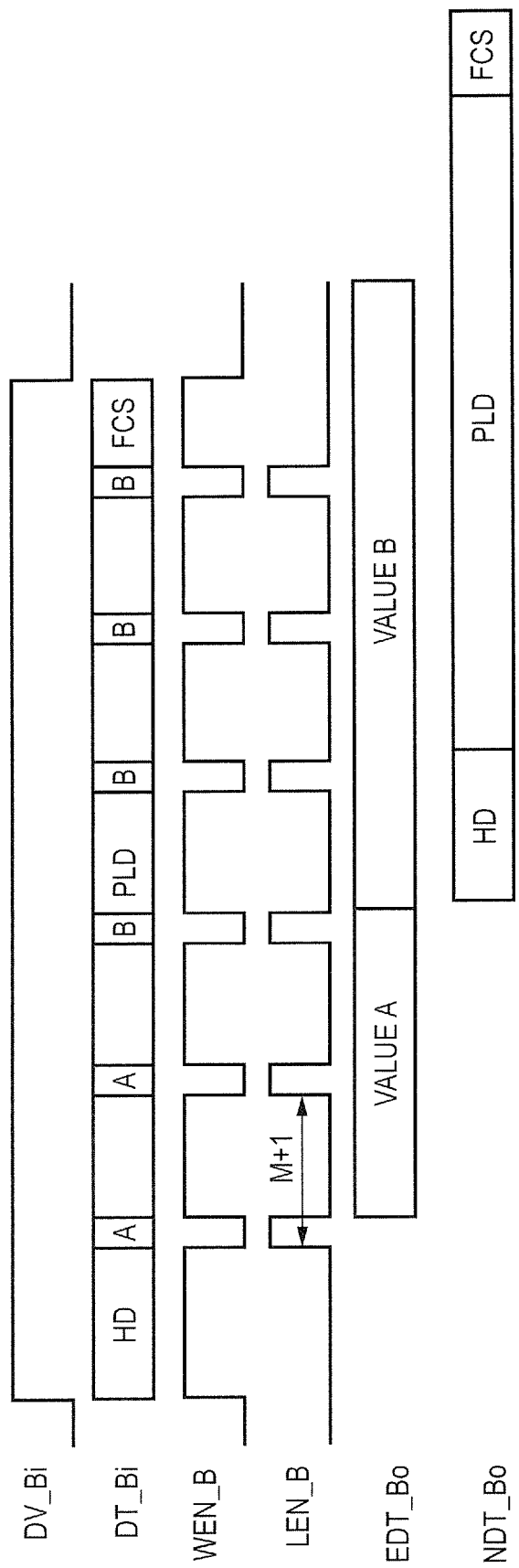
FIG. 8 is a waveform diagram illustrating an exemplary operation of the reception circuit shown in FIG. 7.

FIG. 7 is a circuit block diagram illustrating an exemplary configuration of main parts of the reception circuit in the semiconductor device shown in FIG. 1. FIG. 8 is a waveform diagram illustrating an exemplary operation of the reception circuit shown in FIG. 7. The reception circuit RXC shown in FIG. 7 includes a data valid reception node NDr1, a frame data reception node NDr2, a normal data output node NDo1, and an emergency notification data output node NDo2. The reception circuit RXC further includes an error detection circuit CRCD, an interval setting register SREG B, a data distribution circuit DDC_B, a latch circuit LT_B, and a FIFO buffer FIFO_B. The reception circuit receives a frame in synchronism with a reception clock cycle and performs various processes required for reception.

The data valid reception node NDr1 receives a data valid signal DV_Bi from the network NW1, and the frame data reception node NDr2 receives frame data DT_Bi from the network NW1. The frame data DT_Bi has the same bit width of n bits (e.g., 4 or 8 bits) as is the case with the transmission circuit TXC. As illustrated in FIG. 8, the data valid signal DV_Bi and the frame data DT_Bi are respectively equal to the data valid signal DV_Ao and frame data DT_Ao in FIG. 6. In a precise sense, the data valid signal DV_Bi and the frame data DT_Bi are inputted from the PHY circuit PHY2 shown in FIG. 1, and the data valid signal DV_Bi is generated by the PHY circuit PHY2.

The error detection circuit CRCD calculates the error detecting code (CRC code) for data in the header region HD and payload region PLD of the frame data DT_Bi, and compares the calculated CRC code with the CRC code in the error detecting code region FCS in order to detect an error. As mentioned earlier, the transmission circuit TXC stores, in the error detecting code region FCS, the CRC code for a state where the emergency notification data is inserted. Therefore, the error detection circuit CRCD is able to perform normal error detection on the frame data DT_Bi.

The interval setting register SREG_B retains the interval setting M, which is set, for example, by the CPU shown in FIG. 1. As described with reference to FIGS. 1 and 2, the interval setting M is a value that determines the data intervals at which the emergency notification data is periodically extracted. The same interval setting M is set for the transmission circuit TXC and the reception circuit RXC. The latch circuit LT_B is a circuit for retaining the emergency notification data, and the FIFO buffer FIFO_B is a buffer for retaining the normal data (i.e., the data stored in the header region HD and payload region PLD of a frame).

Although details will be given later, the data distribution circuit DDC_B includes a data counter that cyclically counts the number of reception clock cycles at intervals defined by the interval setting M (cycle count "M+1"), as is the case with the transmission circuit TXC. As illustrated in FIG. 8, based on the count of the data counter, the data distribution circuit DDC_B exercises control so as to set the latch enable signal LEN_B for the latch circuit LT_B at the "1" level at intervals defined by the cycle count "M +1", and controls the write enable signal WEN_B for the FIFO buffer FIFO_B in a complementary relation to the latch enable signal LEN_B.

More specifically, if the count of the data counter is a predetermined value, the data distribution circuit DDC_B exercises control so as to set the latch enable signal LEN_B at the "1" level. In response to the latch enable signal LEN_B, the latch circuit LT B latches (that is, extracts) the frame data DT_Bi, which is received on the associated reception clock cycle, as the emergency notification data, and then outputs the latched emergency notification data from the emergency notification data output node NDo2 as emergency notification data EDT_Bo.

Meanwhile, if the count of the data counter is a value other than the predetermined value, the data distribution circuit DDC_B exercises control so as to set the write enable signal WEN_B at the "1" level. In response to the write enable signal WEN_B, the frame data DT_Bi received on the associated reception clock cycle is written into the FIFO buffer FIFO_B as the normal data. In order to avoid being full, the FIFO buffer FIFO_B performs a read operation on every reception clock cycle and outputs the read data from the normal data output node NDo1 as normal data NDT_Bo.

<<Details of Data Distribution Circuit>>

Figure 9:
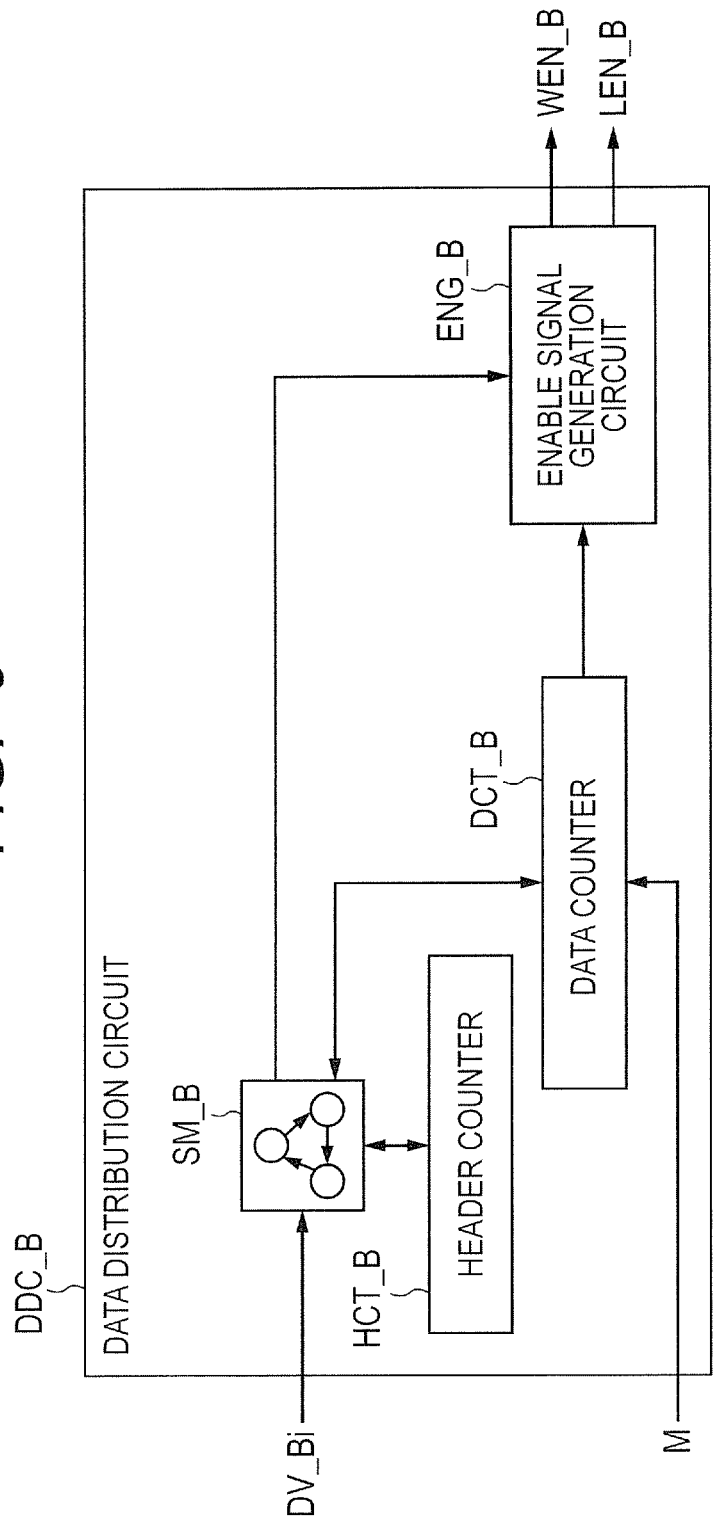
FIG. 9 is a circuit block diagram illustrating an exemplary configuration of a data distribution circuit shown in FIG. 7.
Figure 10:
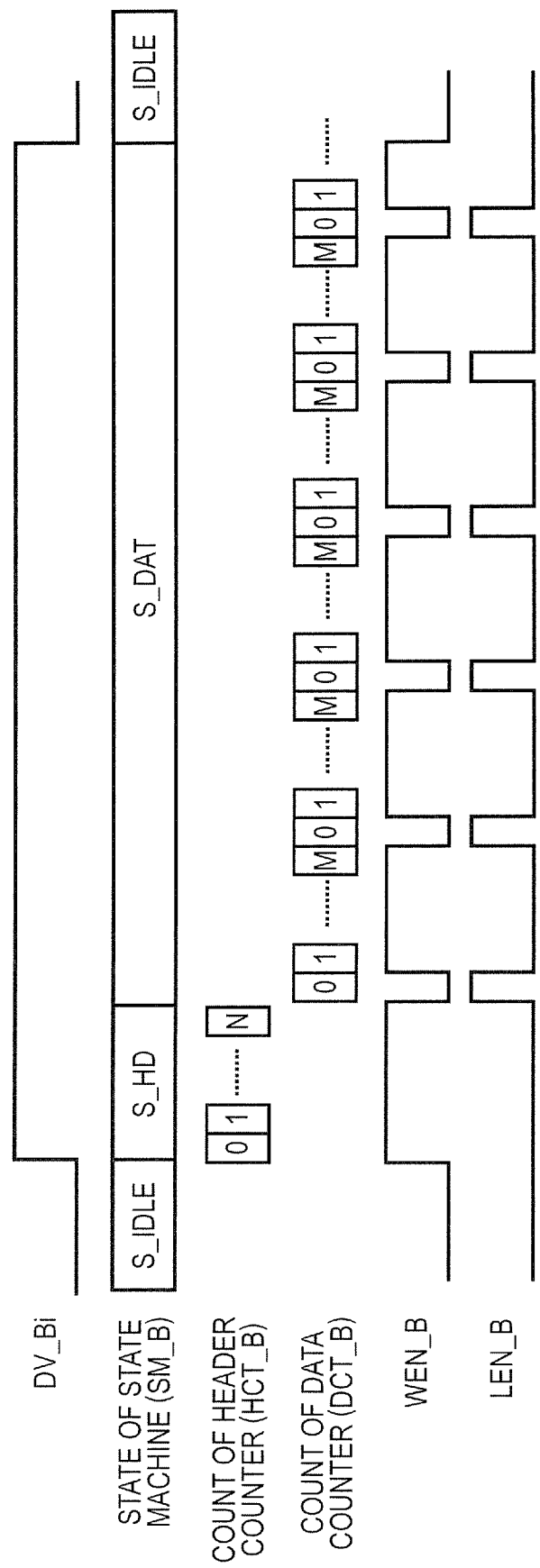
FIG. 10 is a waveform diagram illustrating an exemplary operation of the data distribution circuit shown in FIG. 9.

FIG. 9 is a circuit block diagram illustrating an exemplary configuration of the data distribution circuit shown in FIG. 7. FIG. 10 is a waveform diagram illustrating an exemplary operation of the data distribution circuit shown in FIG. 9. The data distribution circuit DDC_B shown in FIG. 9 includes a header counter HCT_B, a data counter DCT_B, a state machine SM_B, and an enable signal generation circuit ENG_B. The configurations and operations of the header counter HCT_B, data counter DCT_B, and state machine SM_B are the same as described with reference to FIGS. 5 and 6.

In a simple term, when the data valid signal DV_Bi is at the "1" level, the state machine SM_B transitions from the idle state S_IDLE to the header state S_HD as illustrated in FIG. 10. The header counter HCT_B starts a counting operation in response to the above transition, and counts the number of transmission clock cycles "N+1" based on a known data length of the header region HD. When the counting operation of the header counter HCT_B is completed, the state machine SM_B transitions to the data state S_DAT. In response to such a transition, the data counter DCT_B cyclically counts the number of reception clock cycles at intervals defined by the cycle count "M+1".

The enable signal generation circuit ENG_B exercises control so as to set the latch enable signal LEN_B at the "1" level if the data state S_DAT prevails and the count of the data counter DCT_B is "0", and exercises control so as to set the latch enable signal LEN_B at the "0" level if the count is a value other than "0". Further, the enable signal generation circuit ENG_B outputs an inversion of the latch enable signal LEN_B as the write enable signal WEN_B. That is to say, control is exercised so as to set the write enable signal WEN_B at the "0" level when the count of the data counter DCT_B is "0" and at the "1" level when the count is a value other than "0". If the idle state S_IDLE prevails, the enable signal generation circuit ENG_B exercises control so as to set the write enable signal WEN_B at the "0" level.

If the data valid signal DV_Bi is at the "0" level (a condition D) and the count of the data counter DCT_B is a value other than "0" (a condition D) (i.e., the write enable signal WEN_B is at the "1" level, the state machine SM_B transitions from the data state S_DAT to the idle state S_IDLE. In response to the transition to the idle state S_IDLE, the data counter DCT_B terminates the counting operation. The condition D conforms to condition B of the earlier-described state machine SM_A.

When the reception circuit RXC is formed of the counters (HCT_B, DCT_B) and the state machine SM_B in FIG. 9 as described above, the emergency notification data can be extracted by employing a simple configuration and a simple operation scheme. The count of the data counter DCT_B for extracting the emergency notification data is not always limited to "0". However, the same count needs to be used for the transmission circuit TXC and the reception circuit RXC.

<<Main Advantageous Effects of First Embodiment>>

The method according to the first embodiment, which has been described above, makes it possible to transmit an emergency notification with a short delay without waiting until the completion of a current transmission of a frame or retransmitting the frame as indicated in FIG. 30. As a result, beneficial effects are obtained in an in-vehicle communication system or other system where safety requirements are high. Further, the necessity of retransmission and padding is eliminated in marked contrast to comparative example 2. Therefore, the bandwidth overhead due to retransmission and padding can be reduced. Furthermore, as the necessity of retransmission is eliminated, it is possible in some cases to reduce the delay in the transmission of normal data and increase the reliability of a communication system.

The emergency notification data is not limited to error code data or other similar data, but may be certain data (e.g., a value measured by an abnormality sensor) that needs to be regularly transmitted with a short delay. Further, the communication system shown in FIG. 1 is configured so that two-way communication can be established between the semiconductor device DEV1 and the semiconductor device DEV2. However, an alternative configuration may be employed to establish only one-way communication.

Second Embodiment

<<Overview of Communication System (Application Example)>>

Figure 11:
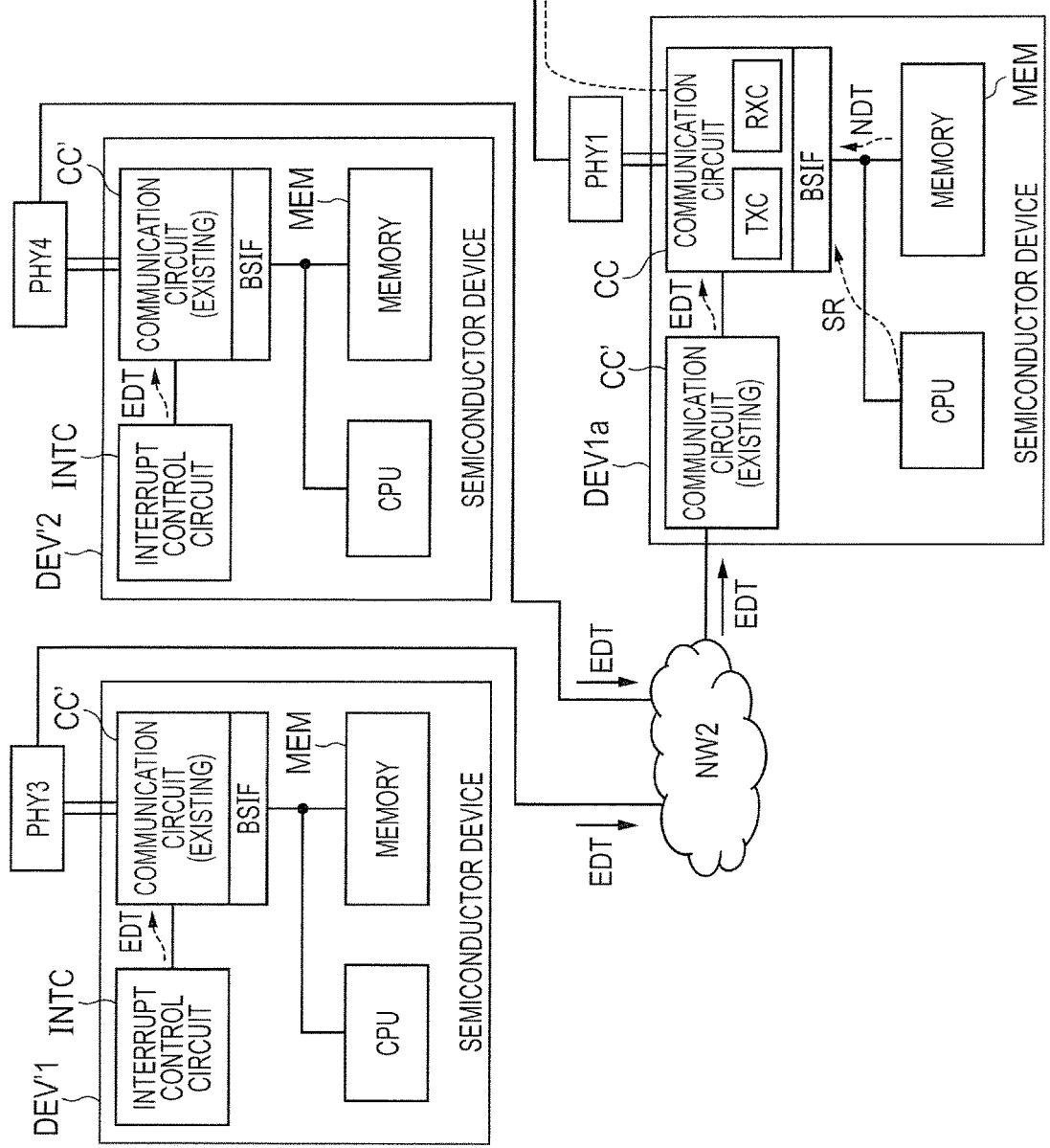
FIG. 11 is a schematic diagram illustrating an exemplary configuration of main parts of the communication system according to a second embodiment of the present invention.

FIG. 11 is a schematic diagram illustrating an exemplary configuration of main parts of the communication system according to a second embodiment of the present invention. The communication system shown in FIG. 11 differs from the communication system shown in FIG. 1 in that the semiconductor device DEV1 in FIG. 1 is replaced with a semiconductor device DEV1a in FIG. 11, and that a network NW2, semiconductor devices DEV'1, DEV'2, and PHY circuits PHY3, PHY4 are added. Each of the semiconductor devices DEV'1, DEV'2 is an existing semiconductor device and includes a regular communication circuit CC' that, for example, transmits and receives frames. The semiconductor devices DEV'1, DEV'2 transmits the emergency notification data EDT generated by the interrupt control circuit INTC to the network NW2 through the regular communication circuit CC'.

The semiconductor device 1a differs from the semiconductor device DEV1 in FIG. 1 in that the interrupt control circuit INTC is replaced with the regular communication circuit CC'. The communication circuit CC' receives the emergency notification data EDT from the semiconductor devices DEV'1, DEV'2 through the network NW2, and outputs the received emergency notification data EDT to the communication circuit CC described in conjunction with the first embodiment. As described in conjunction with the first embodiment, the communication circuit CC periodically inserts the inputted emergency notification data into a frame and transmits the frame (frame data DT) to the network NW1.

<<Main Advantageous Effects of Second Embodiment>>

As described above, the semiconductor device DEV1a relays the emergency notification data transmitted from the semiconductor devices DEV'1, DEV'2. This eliminates the necessity of applying the communication circuit CC according to the first embodiment to all semiconductor devices included in the communication system. For example, an existing network may be used as is as a low-level network (the network NW2 and semiconductor devices DEV' 1, DEV' 2 in the current example), and the method according to the first embodiment may be applied to a portion of a high-level network (the network NW1 and semiconductor devices DEV1a, DEV2 in the current example) where a normal frame and an emergency notification frame coexist. Consequently, the second embodiment not only provides the various advantageous effects described in conjunction with the first embodiment, but also makes it possible to suppress an increase in the cost of the communication system.

Third Embodiment

<<Details of Data Synthesis Processing Circuit (Modified Example)>>

Figure 12:
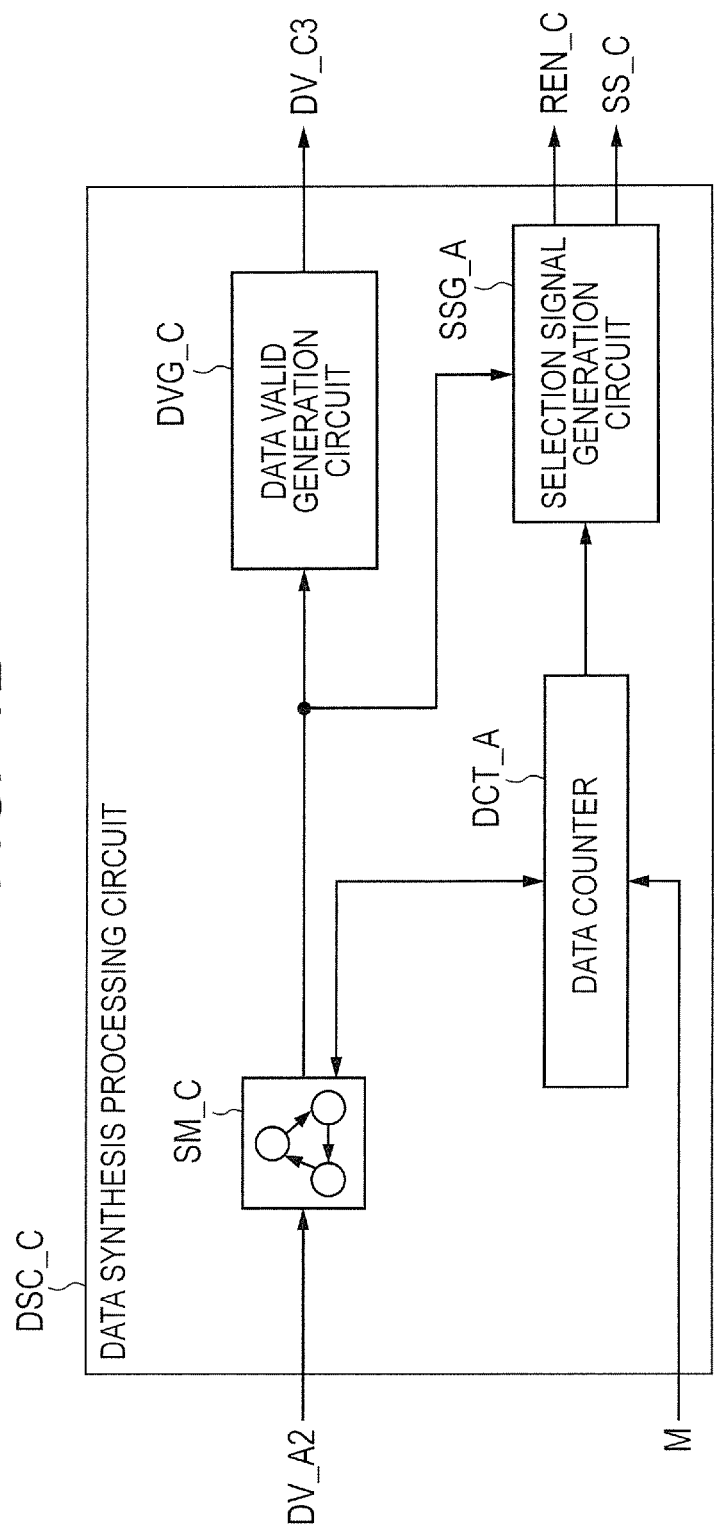
FIG. 12 is a circuit block diagram illustrating an exemplary configuration of the data synthesis processing circuit in FIG. 3 that is included in the semiconductor device according to a third embodiment of the present invention.
Figure 13:
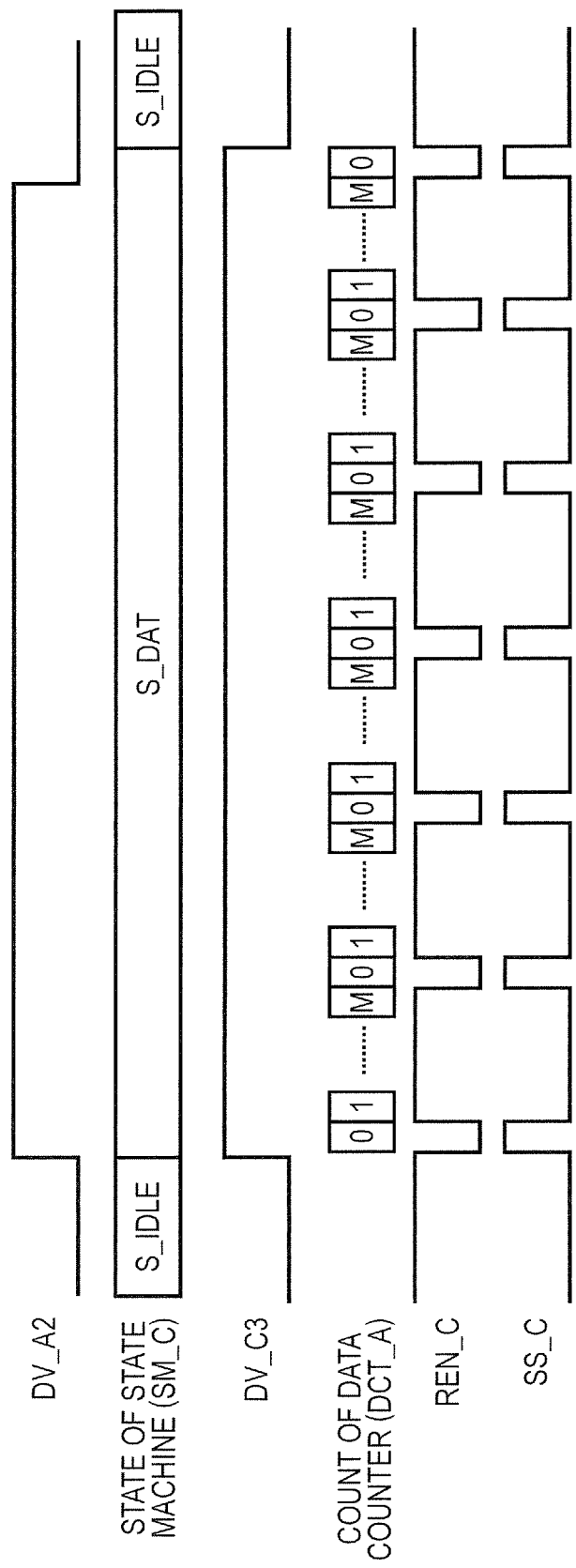
FIG. 13 is a waveform diagram illustrating an exemplary operation of the data synthesis processing circuit shown in FIG. 12.

FIG. 12 is a circuit block diagram illustrating an exemplary configuration of the data synthesis processing circuit in FIG. 3 that is included in the semiconductor device according to a third embodiment of the present invention. FIG. 13 is a waveform diagram illustrating an exemplary operation of the data synthesis processing circuit shown in FIG. 12. The data synthesis processing circuit shown in FIG. 12 differs from the data synthesis processing circuit DSC_A in FIG. 5 in that a state machine SM_C and a data valid generation circuit DVG_C operate in a different manner due to the elimination of the header counter HCT_A.

As illustrated in FIG. 13, a data synthesis processing circuit DSC_C shown in FIG. 12 generally inserts the emergency notification data not only into the payload region PLD of a frame but also into the header region HD in marked contrast to a case shown in FIGS. 5 and 6. As such an operation is performed, when the data valid signal DV_A2 changes from the "0" level to the "1" level, the state machine SM_C transitions from the idle state S_IDLE to the data state S_DAT and not to the header state S_HD. In response to such a transition to the data state S_DAT, the data counter DCT_A starts a counting operation.

The selection signal generation circuit SSG_A exercises control so as to set the read enable signal REN_C at the "0" level if the data state S_DAT prevails and the count of the data counter DCT_A is "0", and exercises control so as to set the read enable signal REN_C at the "1" level in other circumstances. Further, the selection signal generation circuit SSG_A outputs an inversion of the read enable signal REN_C as a selection signal SS_C. In marked contrast to a case shown in FIG. 5, the data valid generation circuit DVG_C exercises control so as to keep a data valid signal DV_C3 at the "1" level during a period of the data state S_DAT.

<<Main Advantageous Effects of Third Embodiment>>

As described above, the emergency notification data begins to be inserted into the header region HD. Consequently, the third embodiment not only provides the various advantageous effects described in conjunction with the first embodiment, but also makes it possible to transmit an emergency notification with a short delay. If, for example, the header length is 14 bytes, the delay time can be reduced by 14-byte time. However, if the emergency notification data is inserted into the header region HD, a general-purpose Ethernet switch, for example, cannot correctly recognize the header region HD. In this sense, therefore, the emergency notification data is preferably inserted into the payload region PLD as described in conjunction with the first embodiment.

Fourth Embodiment

<<Details of Main Parts of Transmission Circuit (Application Example)>>

Figure 14:
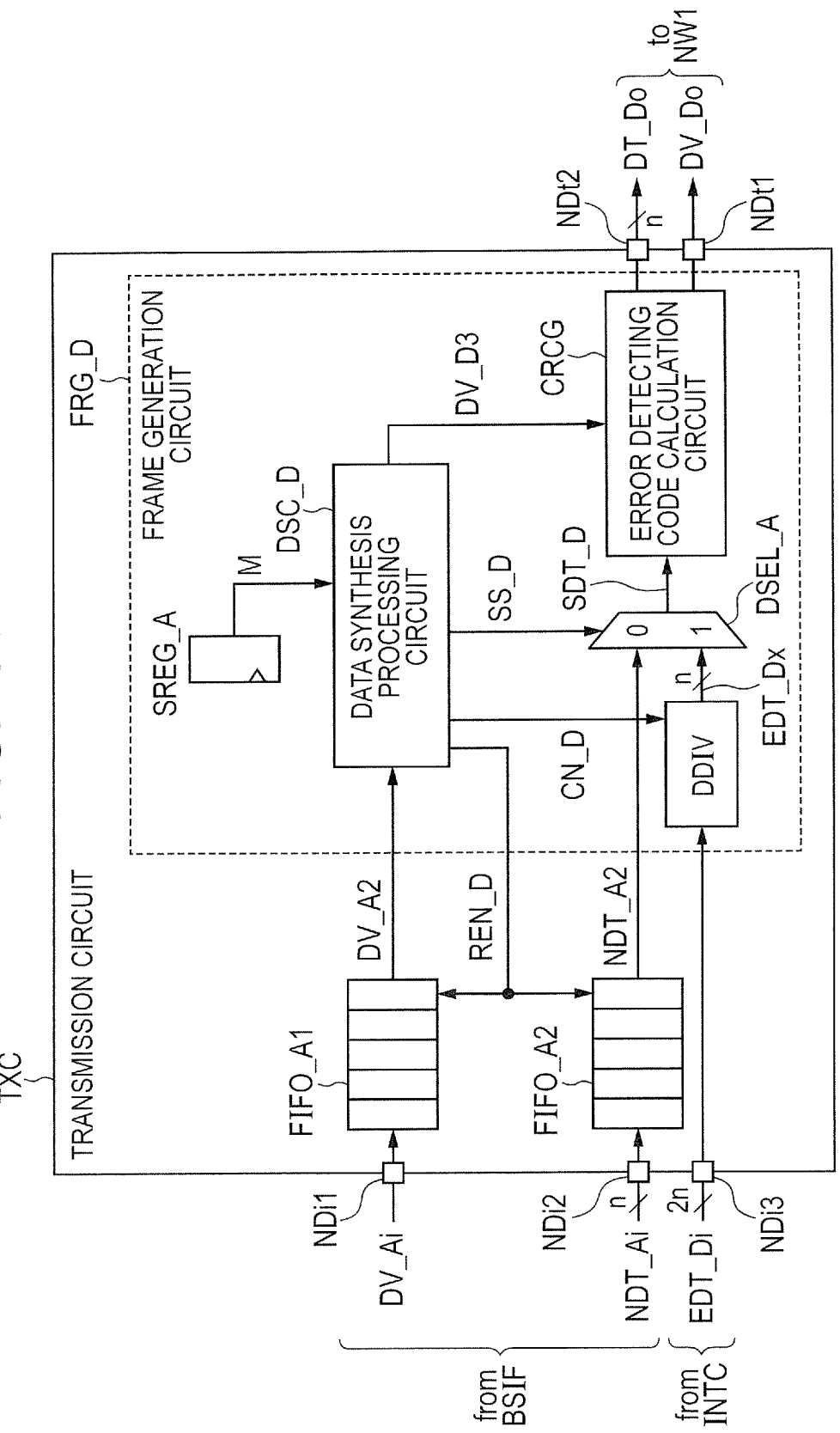
FIG. 14 is a circuit block diagram illustrating an exemplary configuration of main parts of the transmission circuit in FIG. 1 that is included in the semiconductor device according to a fourth embodiment of the present invention.
Figure 15:
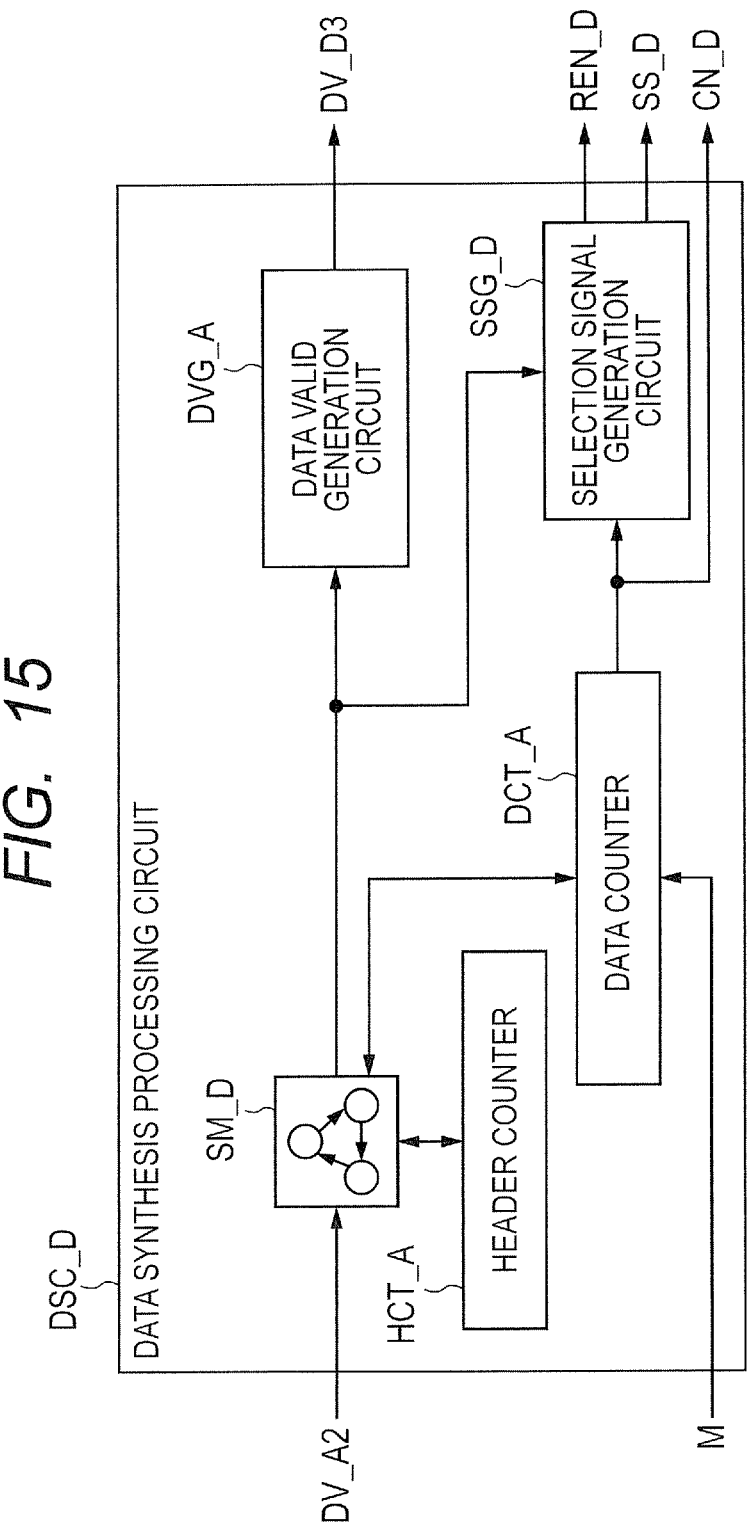
FIG. 15 is a circuit block diagram illustrating an exemplary configuration of the data synthesis processing circuit shown in FIG. 14.
Figure 16:
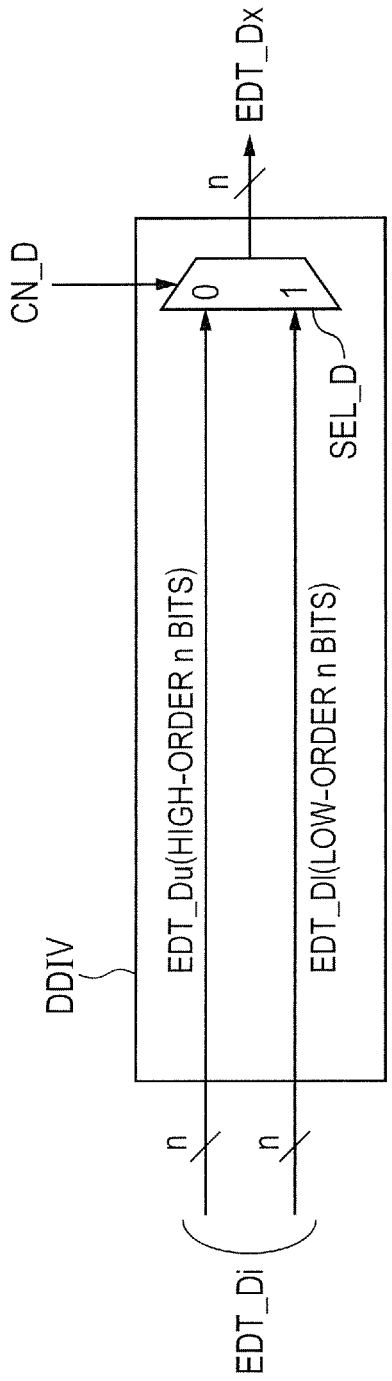
FIG. 16 is a circuit diagram illustrating an exemplary configuration of a data division circuit shown in FIG. 14.
Figure 17:
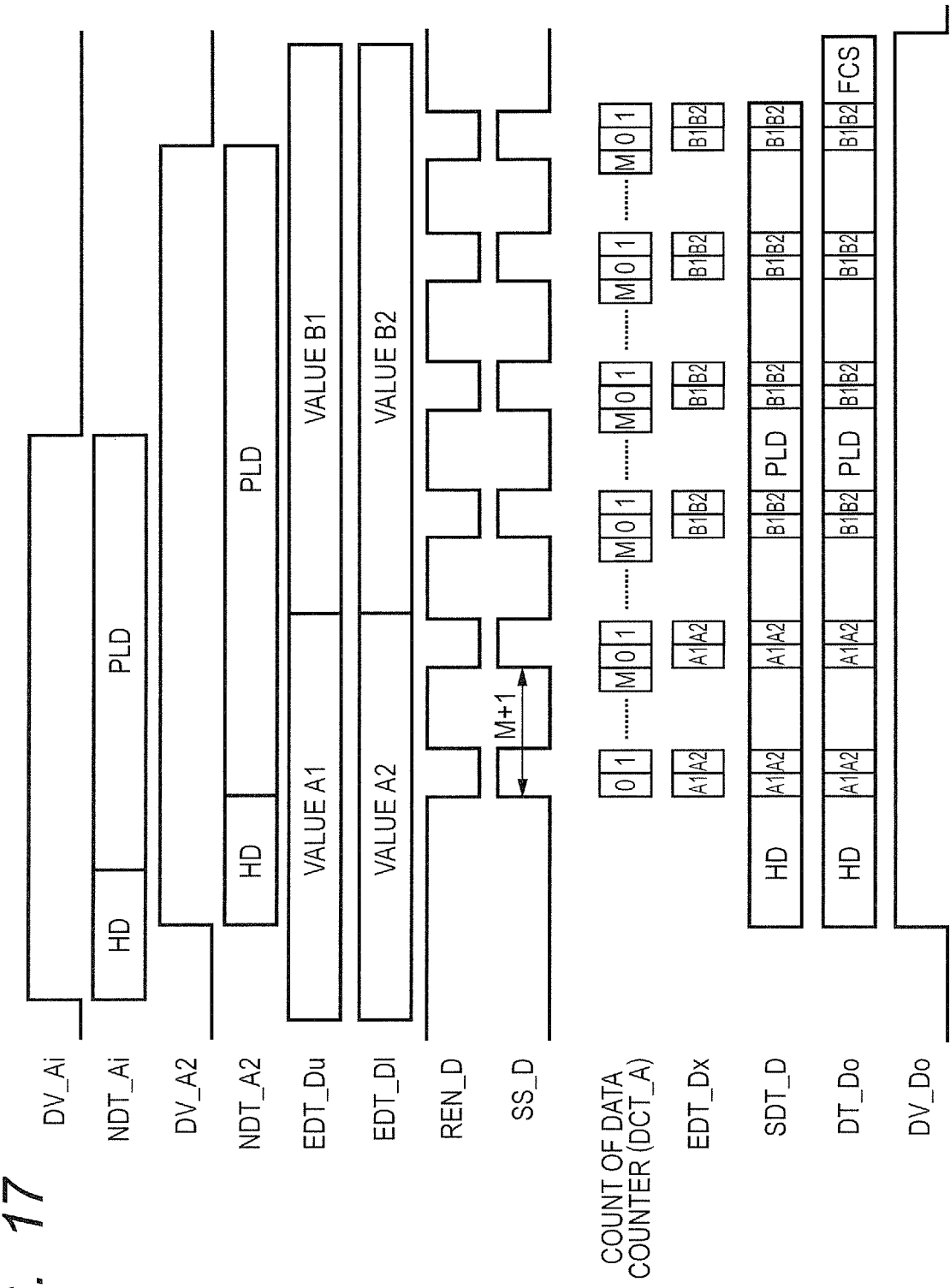
FIG. 17 is a waveform diagram illustrating an exemplary operation of the transmission circuit shown in FIG. 14.
Figure 18:
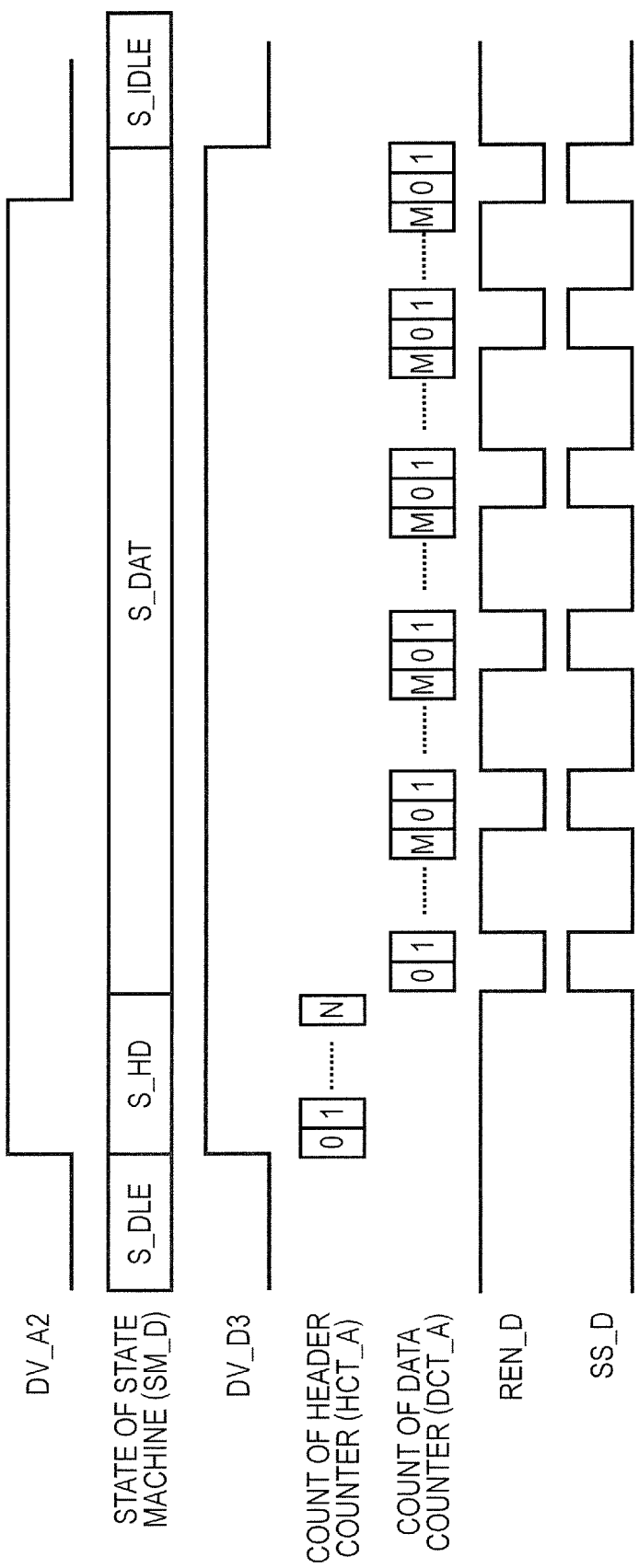
FIG. 18 is a waveform diagram illustrating an exemplary operation of the data synthesis processing circuit shown in FIG. 15.

FIG. 14 is a circuit block diagram illustrating an exemplary configuration of main parts of the transmission circuit in FIG. 1 that is included in the semiconductor device according to a fourth embodiment of the present invention. FIG. 15 is a circuit block diagram illustrating an exemplary configuration of the data synthesis processing circuit shown in FIG. 14. FIG. 16 is a circuit diagram illustrating an exemplary configuration of a data division circuit shown in FIG. 14. FIG. 17 is a waveform diagram illustrating an exemplary operation of the transmission circuit shown in FIG. 14. FIG. 18 is a waveform diagram illustrating an exemplary operation of the data synthesis processing circuit shown in FIG. 15.

The transmission circuit TXC shown in FIG. 14 differs from the exemplary configuration shown in FIG. 3 in that the configuration and operation of a frame generation circuit FRG_D are different from those of the frame generation circuit FRG_A because the bit width of emergency notification data EDT_Di, which is inputted to the emergency notification data input node NDi3, is changed to "2×n" bits. As illustrated in FIG. 17, at intervals defined by the cycle count "M+1", the transmission circuit TXC shown in FIG. 14 generally inserts "2×n"-bit emergency notification data EDT_Di in n-bit increments on two cycles.

The frame generation circuit FRG_D differs from the exemplary configuration shown in FIG. 3 in that a data division circuit DDIV is added, and that the configuration and operation of a data synthesis processing circuit DSC_D are different. As illustrated in FIG. 16, the data division circuit DDIV includes a selection circuit SEL_D. The selection circuit SEL_D selects emergency notification data (high-order) EDT_Du, which are high-order n bits of the emergency notification data EDT_Di, when the count CN_D of the data counter is "0", and selects emergency notification data (low-order) EDT_D1, which are low-order n bits of the emergency notification data EDT_Di, when the count CN_D is "1". The selection circuit SEL_D outputs the selected data as emergency notification data EDT_Dx. If the count CN_D is a value other than "0" or "1", the emergency notification data EDT_Dx may be a don't care value.

As illustrated in FIG. 15, the data synthesis processing circuit DSC_D differs from the data synthesis processing circuit DSC_A in the following three points. Firstly, the data counter DCT_A is a point from which the count CN_D is outputted to the data division circuit DDIV. Secondly, the configuration and operation of a selection signal generation circuit SSG_D are different. Thirdly, the configuration and operation of a state machine SM_D are different.

As illustrated in FIG. 18, the selection signal generation circuit SSG_D exercises control so as to set a read enable signal REN_D at the "0" level if the data state S_DAT prevails and the count of the data counter DCT_A is "0" or "1", and exercises control so as to set the read enable signal REN_D at the "1" level in other circumstances. Further, the selection signal generation circuit SSG_D outputs an inversion of the read enable signal REN_D as a selection signal SS_D. That is to say, control is exercised so as to set the selection signal SS_D at the "1" level when the count of the data counter DCT_A is "0" or "1" and at the "0" level when the count of the data counter DCT_A is a value other than "0" or "1".

The state machine SM D differs from the state machine SM_A shown in FIG. 5 in that condition B under which the aforementioned state transition from the data state S_DAT to the idle state S_IDLE occurs is different. More specifically, the state machine SM_D transitions to the idle state S_IDLE if condition E is met instead of condition B, that is, the count of the data counter DCT_A is a value other than "0" or "1" (i.e., the read enable signal REN_D is at the "1" level). As a result, as illustrated in FIG. 18, a data valid signal DV_D3 from the data valid generation circuit DVG_A may be occasionally extended to be longer than the data valid signal DV_A2 by two cycles.

The data selection circuit DSEL_A shown in FIG. 14 selects the normal data NDT_A2 when the selection signal SS_D is at the "0" level (the read enable signal REN_D is at the "0" level), and selects the emergency notification data EDT_Dx received from the data division circuit DDIV when the selection signal SS_D is at the "1" level (the read enable signal REN_D is at the "0" level). As illustrated in FIG. 17, the data selection circuit DSEL_A then outputs the selected data as selected data SDT_D. In this instance, during the "1"-level period of the selection signal SS_D, the data selection circuit DSEL_A outputs the emergency notification data (high-order) EDT_Du on the first cycle and outputs the emergency notification data (low-order) EDT_D1 on the second cycle.

Subsequently, as is the case with the first embodiment, n-bit frame data DT_Do is transmitted from the frame data transmission node NDt2 through the error detecting code calculation circuit CRCG, and valid data signal DV_Do is transmitted from the data valid transmission node NDt1 through the error detecting code calculation circuit CRCG. Although not described in detail, when the reception circuit RXC is changed in the same manner as the transmission circuit TXC, the emergency notification data divided into two cycles can be received. Further, although the current example assumes that the emergency notification data is divided into two cycles, the emergency notification data can be divided into three or more cycles.

<<Main Advantageous Effects of Fourth Embodiment>>

As described above, the method according to the fourth embodiment not only provides the various advantageous effects described in conjunction with the first embodiment, but also makes it possible to properly handle a case where the bit width of the emergency notification data is greater than that of the normal data. That is to say, emergency notification data having a relatively large data size can be transmitted without being restricted by the bit width of the normal data. This provides, for example, improved convenience of user.

Fifth Embodiment

<<Postulated Problems>>

When the earlier-described method according to the first embodiment is used, the reception cycle of emergency notification data may coincide with the reception cycle of CRC code in the reception circuit RXC depending on the combination of frame length and interval setting M. In such an instance, the CRC code may be erroneously recognized as emergency notification data. More specifically, referring, for instance, to FIG. 8, the frame data DT_Bi received on a cycle on which the latch enable signal LEN_B is at the "1" level is simply recognized as the emergency notification data EDT_Bo by the reception circuit RXC. Therefore, if, for example, a situation arises where the latch enable signal LEN_B is at the "1" level during a period (4-byte) of the error detecting code region FCS, the reception circuit RXC has no way of knowing that data received on such a cycle is a CRC code.

Meanwhile, it is possible to prevent the reception cycle of emergency notification data and the reception cycle of CRC code from coinciding with each other, for example, by restricting the combination of frame length and interval setting M. However, such restriction leads to degraded a convenience of the user. Under the above circumstances, the following method will be beneficial.

<<Details of Main Parts of Reception Circuit (Application Example)>>

Figure 19:
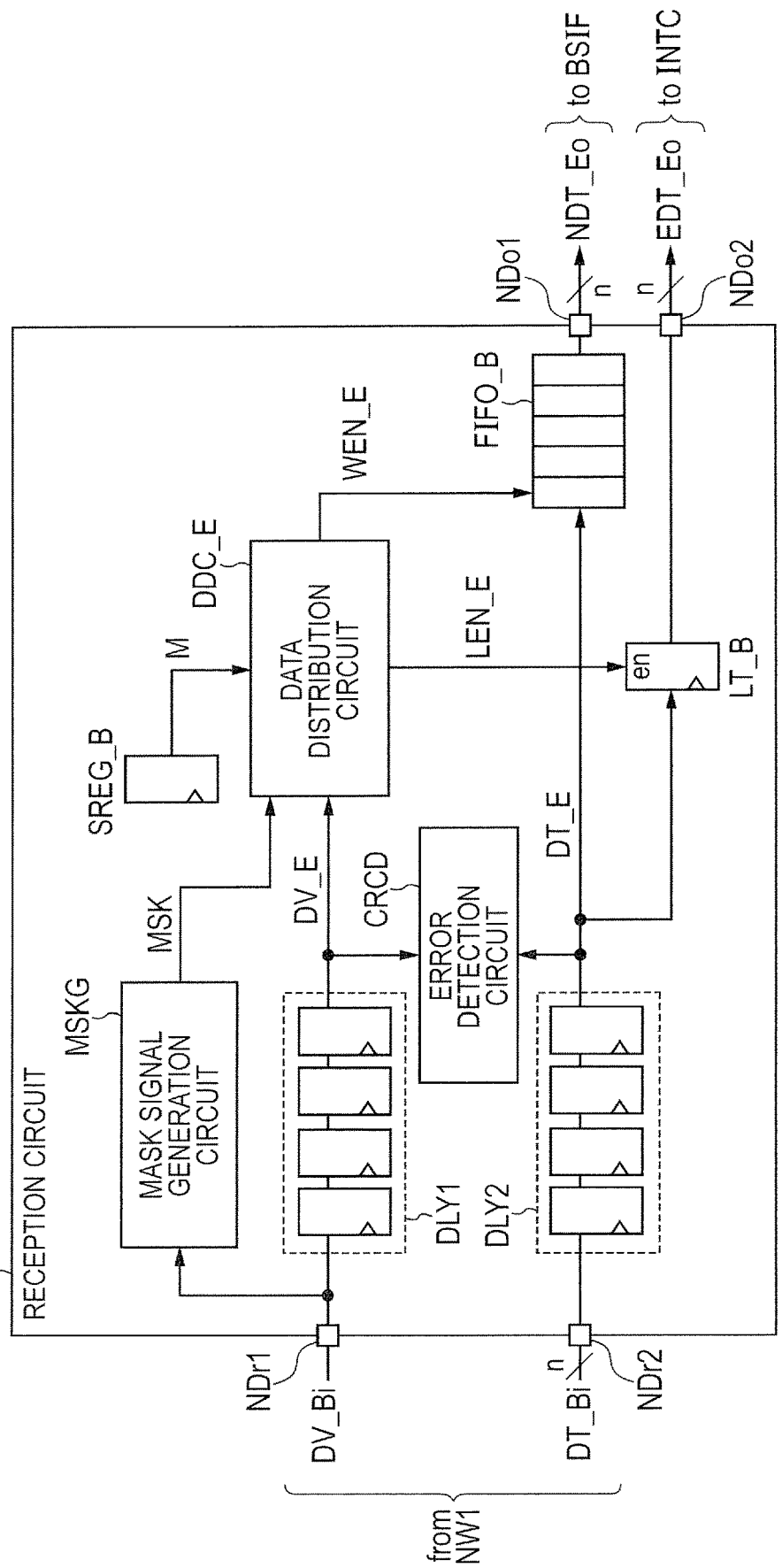
FIG. 19 is a circuit block diagram illustrating an exemplary configuration of main parts of the reception circuit in FIG. 1 that is included in the semiconductor device according to a fifth embodiment of the present invention.
Figure 20:
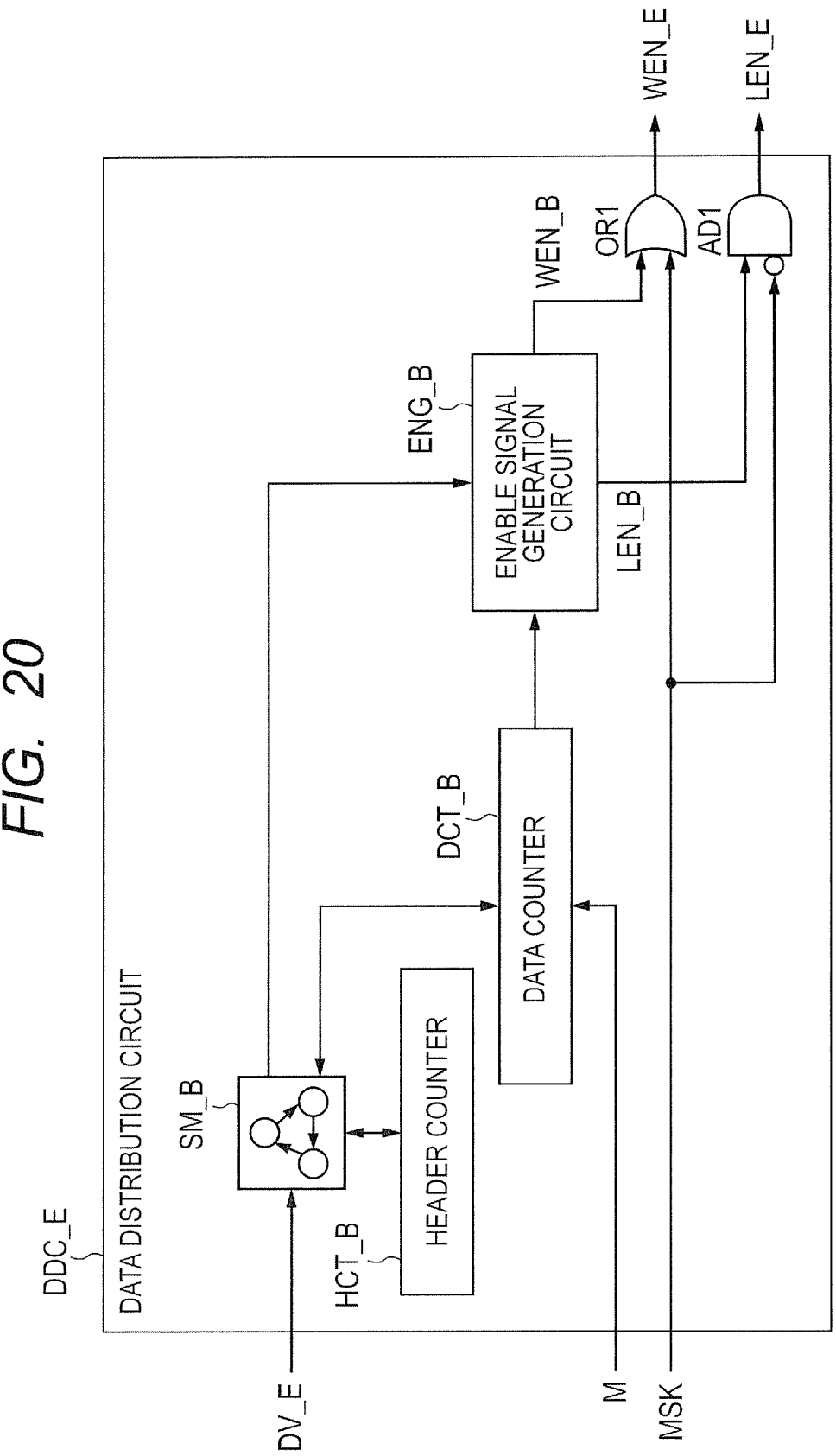
FIG. 20 is a circuit block diagram illustrating an exemplary configuration of the data distribution circuit shown in FIG. 19.
Figure 21:
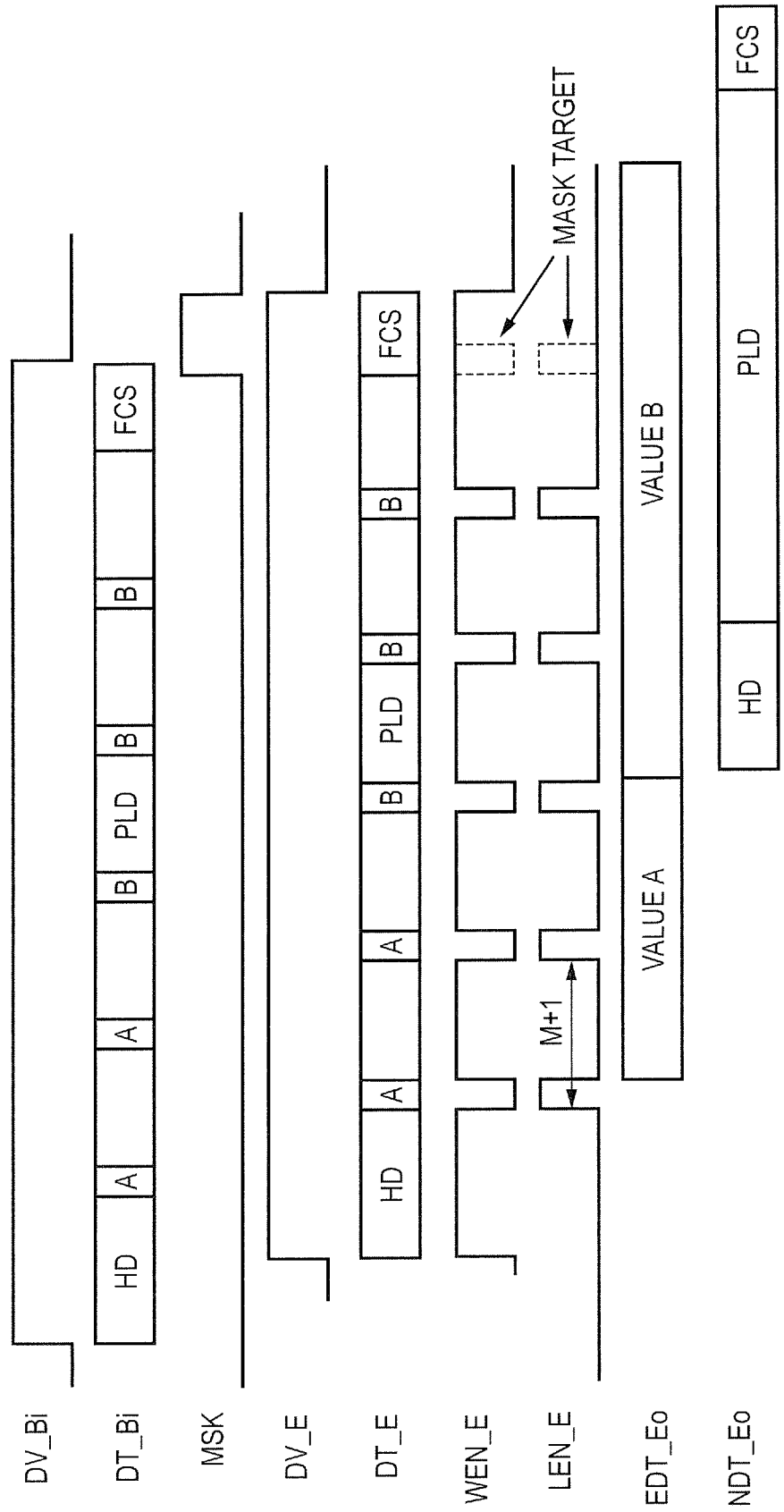
FIG. 21 is a waveform diagram illustrating an exemplary operation of the reception circuit shown in FIG. 19.

FIG. 19 is a circuit block diagram illustrating an exemplary configuration of main parts of the reception circuit in FIG. 1 that is included in the semiconductor device according to a fifth embodiment of the present invention. FIG. 20 is a circuit block diagram illustrating an exemplary configuration of the data distribution circuit shown in FIG. 19. FIG. 21 is a waveform diagram illustrating an exemplary operation of the reception circuit shown in FIG. 19. The reception circuit RXC shown in FIG. 19 differs from the exemplary configuration shown in FIG. 7 in that delay circuits DLY1, DLY2 and a mask signal generation circuit MSKG are added, and that the configuration and operation of a data distribution circuit DDC_E are different.

As illustrated in FIG. 21, the mask signal generation circuit MSKG outputs K cycles of a mask signal MSK when the data valid signal DV_Bi received by the data valid reception node NDr1 transitions from the "1" level to the "0" level. The term "K cycles" denotes the number of clock cycles based on the data length of the CRC code of a frame. If, for instance, the bit width n of frame data DT_Bi is 1 byte, the term "K cycles" indicates 4 cycles.

As illustrated in FIG. 21, the delay circuit DLY1 delays the data valid signal DV_Bi received by the data valid reception node NDr1 by K cycles (e.g., 4 cycles), and then outputs a delayed data valid signal DV_E. Similarly, the delay circuit DLY2 delays a frame (frame data DT_Bi) received by the frame data reception node NDr2 by K cycles (e.g., 4 cycles, and then outputs a delayed frame (frame data DT_E.

Consequently, as illustrated in FIG. 21, during a period during which the frame data DT_E is the data of the error detecting code region FCS, it is possible to output a "1"-level mask signal MSK that corresponds to the period. Accordingly, when the count of the data counter DCT_B is a predetermined value (e.g., "0") and the mask signal MSK is not outputted, the data distribution circuit DDC_E extracts the frame data DT_E as emergency notification data EDT_Eo by exercising control so as to set a latch enable signal LEN_E at the "1" level.

Meanwhile, when the count of the data counter DCT_B is a predetermined value (e.g., "0") and the mask signal MSK is outputted, the data distribution circuit DDC_E refrains from extracting the emergency notification data from the frame data DT_E by masking the "1" level of the latch enable signal LEN_E. Instead, the data distribution circuit DDC_E writes the frame data DT_E into the FIFO buffer FIFO_B by masking the "0" level of a write enable signal WEN_E.

In order to perform the above-described operations, the data distribution circuit DDC_E has a configuration illustrated, for example, in FIG. 20. The data distribution circuit DDC_E shown in FIG. 20 differs from the data distribution circuit DDC_B shown in FIG. 9 in that the state machine SM_B inputs the delayed data valid signal DV_E, and that an OR operation circuit OR1 and an AND operation circuit AD1 are added. The AND operation circuit AD1 outputs the latch enable signal LEN_E by ANDing the latch enable signal LEN_B from the enable signal generation circuit ENG_B and an inversion of the mask signal MSK. The OR operation circuit OR1 outputs the write enable signal WEN_E by ORing the write enable signal WEN_B from the enable signal generation circuit ENG_B and the mask signal MSK.

<<Main Advantageous Effects of Fifth Embodiment>>

As described above, the method according to the fifth embodiment not only provides the various advantageous effects described in conjunction with the first embodiment, but also makes it possible to prevent the reception circuit RXC from erroneously recognizing a CRC code as emergency notification data. Further, in this instance, there is no need to restrict the combination of frame length and interval setting M. This provides, for example, improved convenience of user.

Sixth Embodiment

<<Details of Main Parts of Transmission Circuit (Application Example)>>

Figure 22:
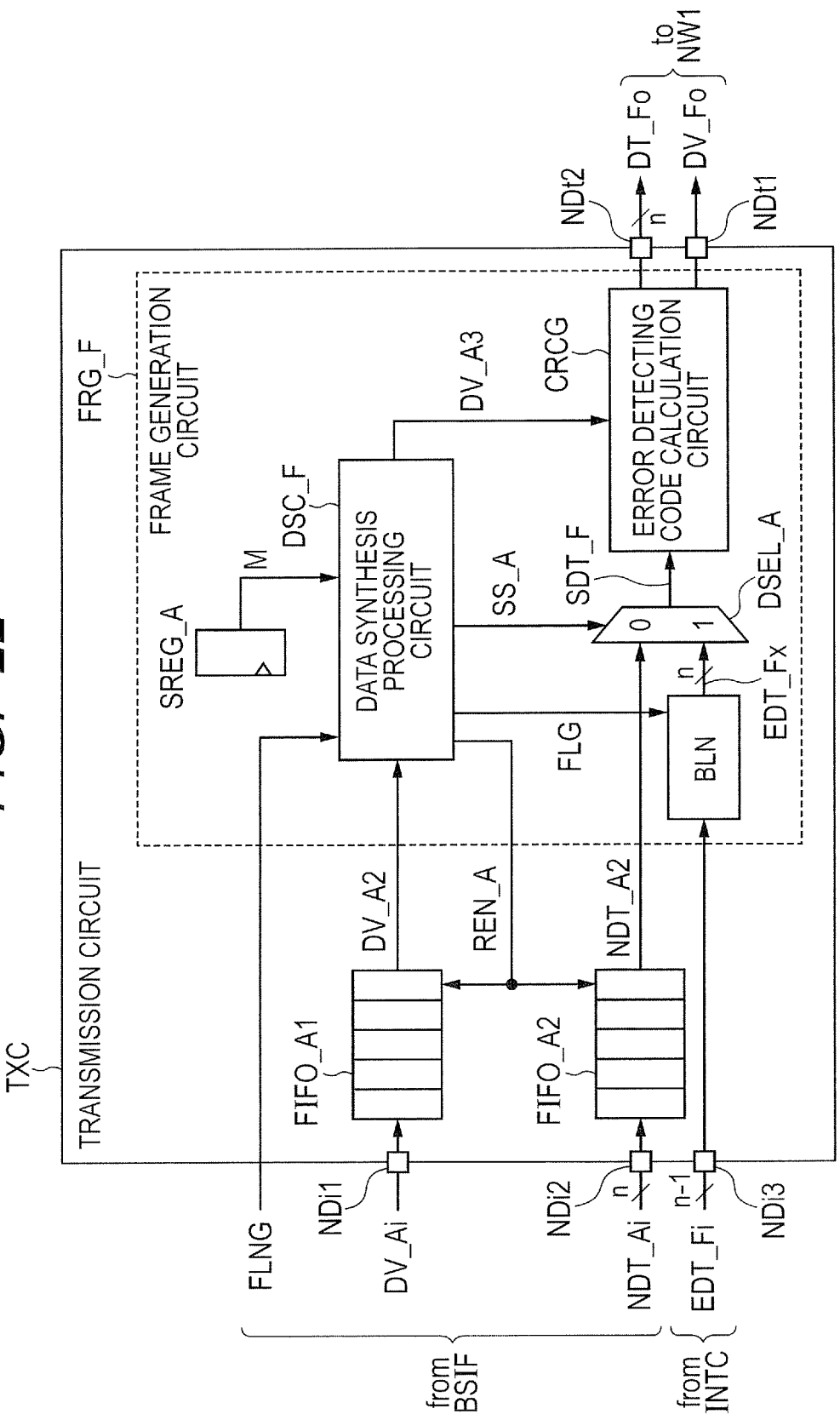
FIG. 22 is a circuit block diagram illustrating an exemplary configuration of main parts of the transmission circuit in FIG. 1 that is included in the semiconductor device according to a sixth embodiment of the present invention.
Figures 23A, 23B:
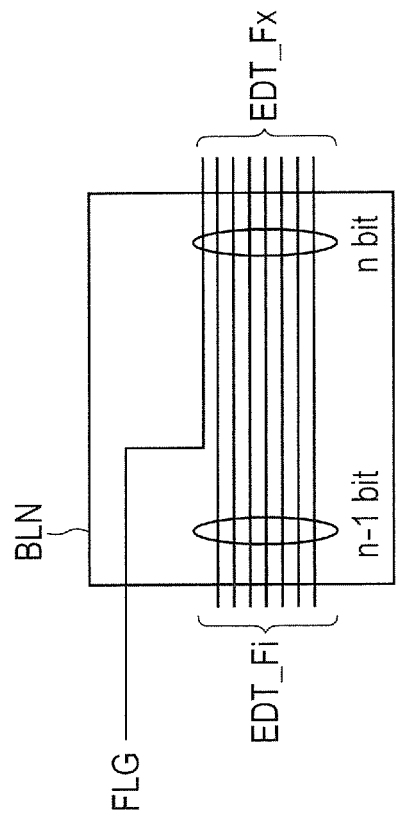
FIG. 23A is a circuit diagram illustrating an exemplary configuration of a bit coupling circuit shown in FIG. 22.
FIG. 23B is a diagram illustrating a concrete example of input and output of the bit coupling circuit shown in FIG. 23A.
Figure 24:
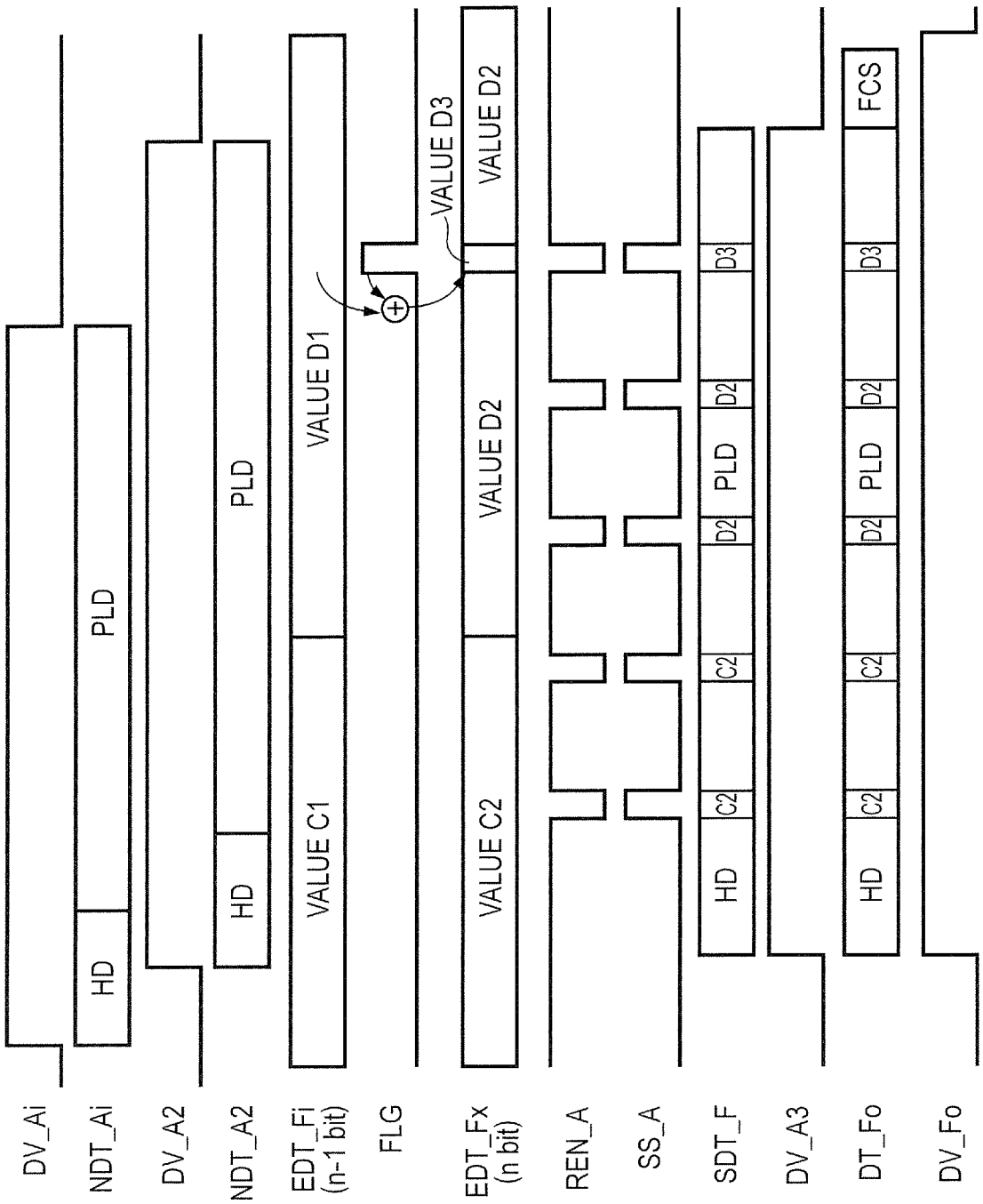
FIG. 24 is a waveform diagram illustrating an exemplary operation of the transmission circuit shown in FIG. 22.

FIG. 22 is a circuit block diagram illustrating an exemplary configuration of main parts of the transmission circuit in FIG. 1 that is included in the semiconductor device according to a sixth embodiment of the present invention. FIG. 23A is a circuit diagram illustrating an exemplary configuration of a bit coupling circuit shown in FIG. 22. FIG. 23B is a diagram illustrating a concrete example of input and output of the bit coupling circuit shown in FIG. 23A. FIG. 24 is a waveform diagram illustrating an exemplary operation of the transmission circuit shown in FIG. 22. The method according to the sixth embodiment addresses the problem of erroneous recognition, which is described in conjunction with the fifth embodiment, in a manner different from the one described in conjunction with the fifth embodiment.

As illustrated in FIG. 24, the transmission circuit TXC generally stores a final data flag FLG of a predetermined logic level ("1" level in the current example) at one of n bits of emergency notification data EDT_Fx on a cycle on which the insertion of the emergency notification data EDT_Fx is terminated for each frame. In response to such storage, the reception circuit RXC, as described later, does not extract the emergency notification data from each frame after detecting the final data flag FLG of the predetermined logic level.

The transmission circuit TXC shown in FIG. 22 differs from the exemplary configuration shown in FIG. 3 in that the configuration and operation of a frame generation circuit FRG_F are different as the bit width of emergency notification data EDT_Fi to be inputted to the emergency notification data input node NDi3 is changed to "n−1" bits. Further, in marked contrast to the exemplary configuration shown in FIG. 3, the transmission circuit TXC is configured so as to input a frame length FLNG from the bus interface BSIF.

The frame generation circuit FRG F differs from the frame generation circuit FRG_A in FIG. 3 in that a bit coupling circuit BLN is added, and that the configuration and operation of a data synthesis processing circuit DSC_F are different. As illustrated in FIG. 23A, the bit coupling circuit BLN couples "n−1" bit emergency notification data EDT_Fi to a 1-bit final data flag FLG from the data synthesis processing circuit DSC_F, and outputs n-bit emergency notification data EDT_Fx.

Although not shown, the data synthesis processing circuit DSC_F has the same configuration as the data synthesis processing circuit DSC_A in FIG. 5, but additionally includes a circuit that outputs the final data flag FLG based on an inputted frame length FLNG and interval setting M. That is to say, when the frame length FLG and the interval setting M (cycle count "M+1") are known in advance, the data synthesis processing circuit DSC_F can calculate the time point of a final cycle on which the insertion of emergency notification data terminates, and outputs a "1"-level final data flag FLG at the calculated time point.

The data selection circuit DSEL_A shown in FIG. 22 selects the normal data NDT_A2 when the selection signal SS_A is at the "0" level (the read enable signal REN_A is at the "1" level), and selects the emergency notification data EDT_Fx received from the bit coupling circuit BLN when the selection signal SS_A is at the "1" level (the read enable signal REN_A is at the "0" level). As illustrated in FIG. 24, the data selection circuit DSEL_A then outputs the selected data as selected data SDT_F.

Referring now to FIG. 24, when n=8, values C2, D2, and D3 of the selected data SDT F outputted during a "1"-level period of the selection signal SS_A (i.e., the emergency notification data EDT_Fx) are as indicated in FIG. 23B. For example, the 0th to 6th bits of the value D2 represent the value D1, which is the emergency notification data EDT_Fi, and the 7th bit of the value D2 represents a "0"-level final data flag FLG. Meanwhile, the 0th to 6th bits of the value D3 represent the same value D1, but the 7th bit of the value D3 represents a "1"-level final data flag FLG.

<<Details of Main Parts of Reception Circuit (Application Example)>>

Figure 25:
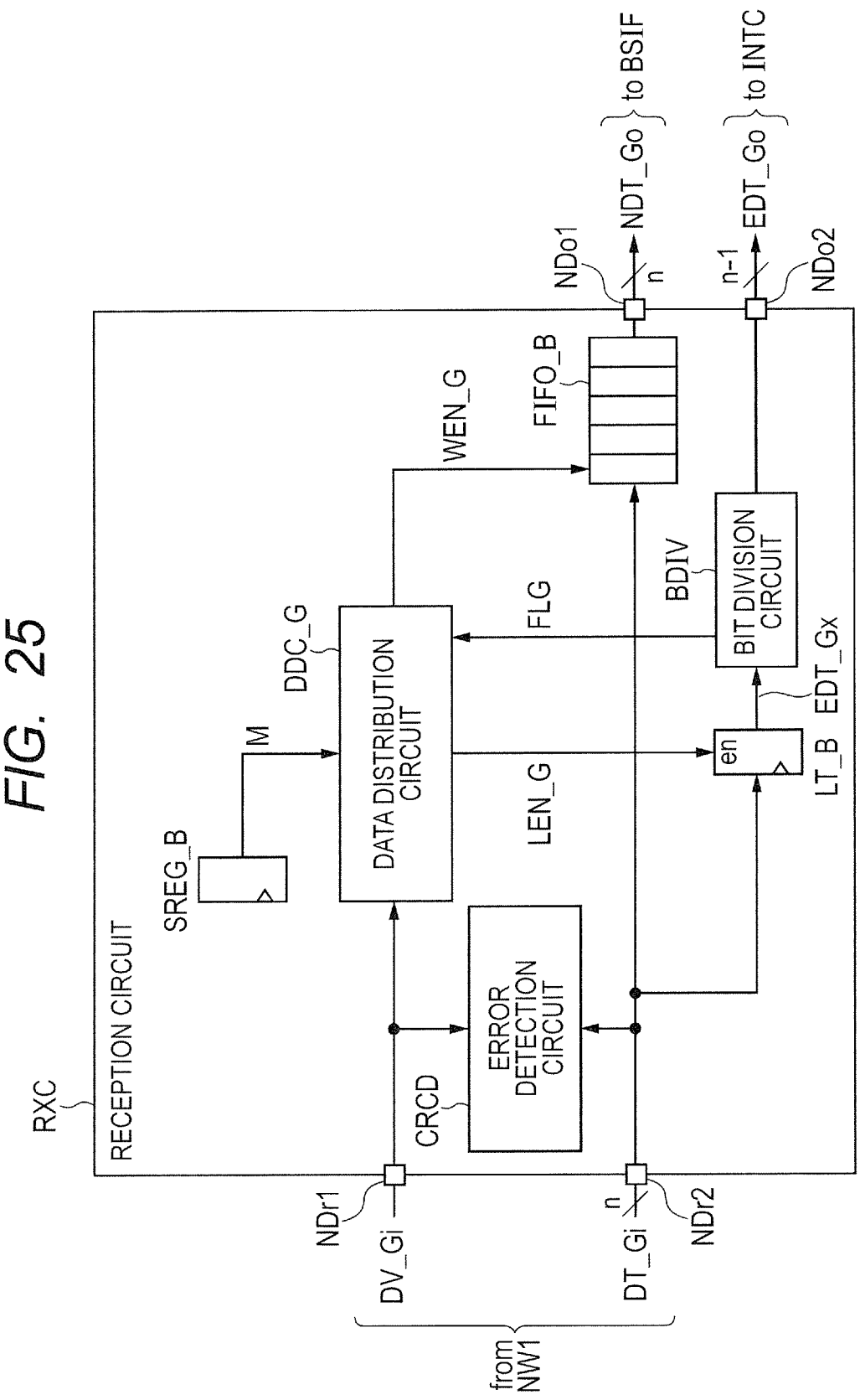
FIG. 25 is a circuit block diagram illustrating an exemplary configuration of main parts of the reception circuit in FIG. 1 that is included in the semiconductor device according to the sixth embodiment of the present invention.
Figure 26:
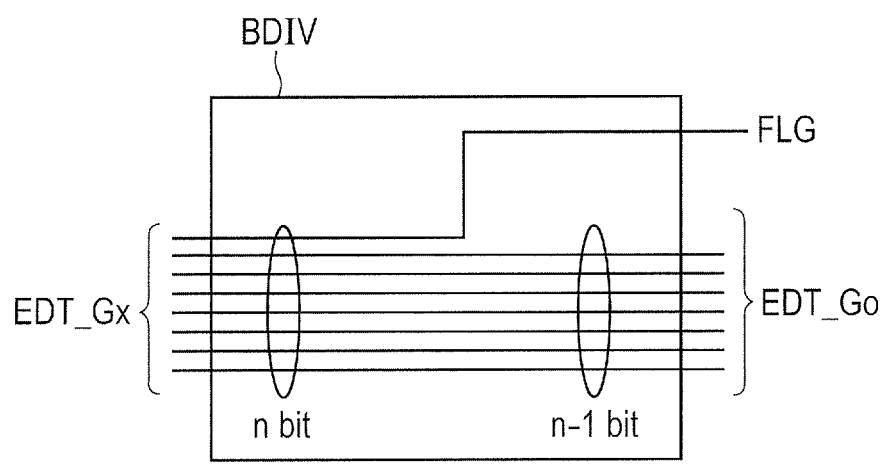
FIG. 26 is a circuit diagram illustrating an exemplary configuration of a bit division circuit shown in FIG. 25.
Figure 27:
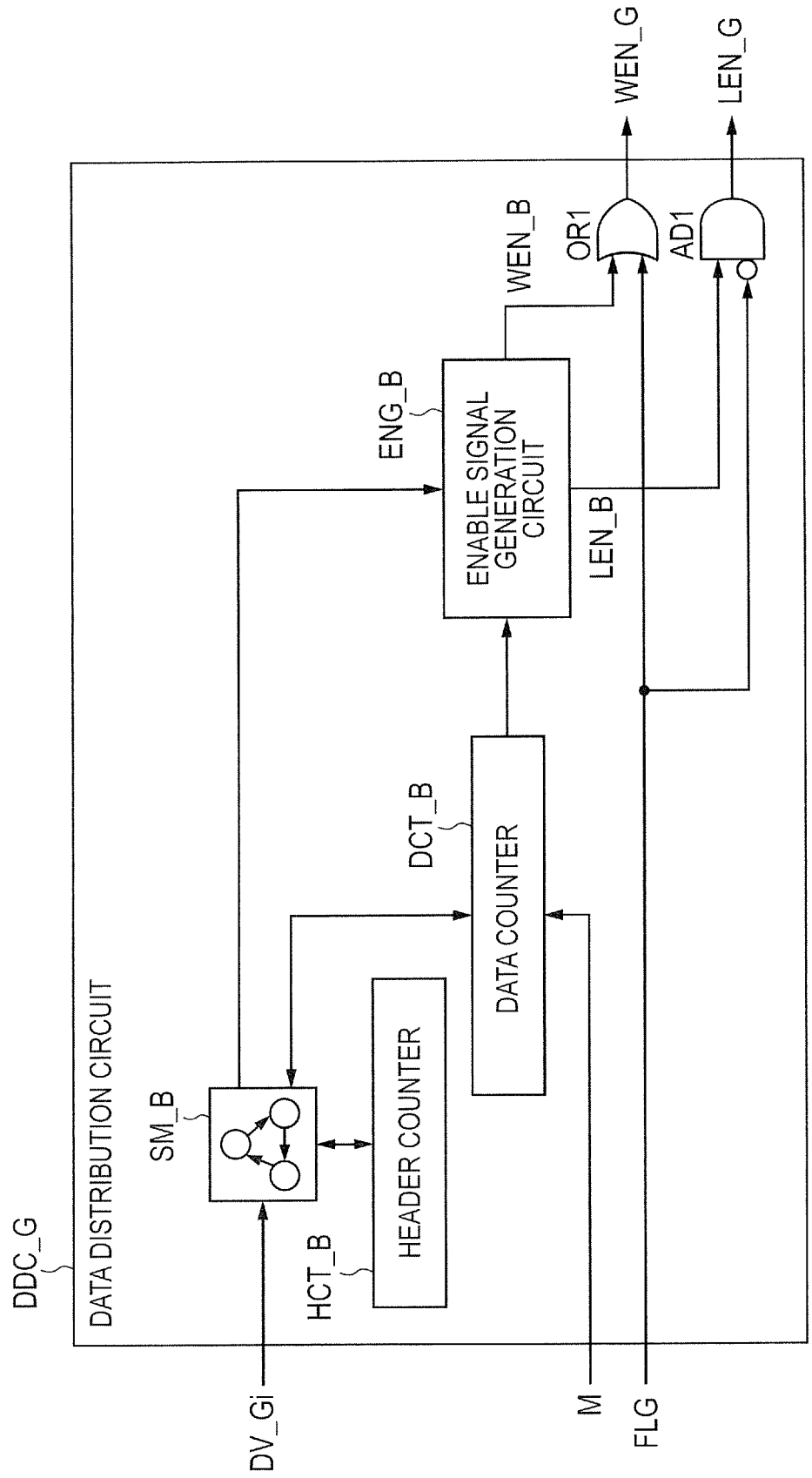
FIG. 27 is a circuit block diagram illustrating an exemplary configuration of the data distribution circuit shown in FIG. 25.

FIG. 25 is a circuit block diagram illustrating an exemplary configuration of main parts of the reception circuit in FIG. 1 that is included in the semiconductor device according to the sixth embodiment of the present invention. FIG. 26 is a circuit diagram illustrating an exemplary configuration of a bit division circuit shown in FIG. 25. FIG. 27 is a circuit block diagram illustrating an exemplary configuration of the data distribution circuit shown in FIG. 25. FIG. 28 is a waveform diagram illustrating an exemplary operation of the reception circuit shown in FIG. 25. The reception circuit RXC shown in FIG. 25 differs from the exemplary configuration shown in FIG. 7 in that a bit division circuit BDIV is added, and that the configuration and operation of a data distribution circuit DDC_G are different.

A data valid signal DV_Gi is inputted to the data valid reception node NDr1 of the reception circuit shown in FIG. 25, and frame data DT_Gi is inputted to the frame data reception node NDr2. As illustrated in FIG. 28, the data valid signal DV_Gi and the frame data DT_Gi are respectively equal to the data valid signal DV_Fo and frame data DT_Fo (see FIG. 24) transmitted from the transmission circuit TXC shown in FIG. 22.

As illustrated in FIGS. 25 and 26, n-bit emergency notification data EDT_Gx from the latch circuit LT_B is inputted to the bit division circuit BDIV. The bit division circuit BDIV outputs the 0th to "n−1"th bits of the emergency notification data EDT Gx from the emergency notification data output node NDo2 as emergency notification data EDT_Go, and outputs the nth bit to the data distribution circuit DDC_G as the final data flag FLG.

As illustrated in FIG. 27, the data distribution circuit DDC_G differs from the data distribution circuit DDC_E in FIG. 20 in that the mask signal MSK is replaced with the final data flag FLG. The latch circuit LT_B shown in FIG. 25 periodically extracts the emergency notification data EDT_Gx from the frame data DT_Gi in response to a latch enable signal LEN_G from the data distribution circuit DDC_G. As illustrated in FIG. 28, if the extracted emergency notification data EDT_Gx is the value D3 containing the "1"-level final data flag FLG, the bit division circuit BDIV outputs the "1"-level final data flag FLG to the data distribution circuit DDC_G.

By using the final data flag FLG instead of the mask signal MSK shown in FIG. 21, the data distribution circuit DDC_G ORs and ANDs the write enable signal WEN_B and latch enable signal LEN_B from the enable signal generation circuit ENG_B, as is the case with FIG. 21. As a result, after detecting the "1"-level final data flag FLG, the data distribution circuit DDC_G masks the "0" level of a write enable signal WEN_G for the FIFO buffer FIFO_B and the "1" level of the latch enable signal LEN_G for the latch circuit LT_B, as illustrated in FIG. 28. Consequently, the emergency notification data will not be extracted after the detection of the "1"-level final data flag FLG.

<<Main Advantageous Effects of Sixth Embodiment>>

As described above, the method according to the sixth embodiment provides the same advantageous effects as the method according to the fifth embodiment, which has been described earlier. Further, in marked contrast to the method according to the fifth embodiment, the method according to the sixth embodiment does not require the delay circuits DLY1, DLY2 in the reception circuit RXC. This makes it possible to transmit the emergency notification data, for example, to the interrupt control circuit INTC in the reception circuit RXC with a shorter delay.

Seventh Embodiment

<<Communication System Operation Method>>

A method of determining the interval setting M described in conjunction with the first, second, fourth, fifth, and sixth embodiments will now be described. The interval setting M may be determined as desired. In principle, the smaller the interval setting, the shorter the delay with which the emergency notification data can be transmitted. In reality, however, an excessively small interval setting may not always shorten the delay. FIG. 29 is a diagram illustrating an exemplary method of determining the interval setting in the communication system according to a seventh embodiment of the present invention.

FIG. 29 shows a state where a frame FR is successively transmitted. "X" in the frame FR represents the value of the emergency notification data. In reality, however, an inter-frame emergency notification interval T1 exists outside a frame as indicated in FIG. 29. The worst value of emergency notification delay time is restricted by the inter-frame emergency notification interval T1. The inter-frame emergency notification interval T1 is the sum of the CRC length (e.g., 4 bytes) of the error detecting code region FCS, the intervals of the frame FR that are defined, for example, by a standard, and the header length (including a preamble region) of the header region HD (e.g., 22 bytes).

As described above, the worst value is restricted by the inter-frame emergency notification interval T1. Therefore, the interval setting M is preferably such that the data intervals corresponding to the cycle count "M+1" are not shorter than the inter-frame emergency notification interval T1. The interval setting M is more preferably such that the data intervals are equivalent to the inter-frame emergency notification interval T1. This makes it possible to determine the worst value of emergency notification delay time by the interval setting M and suppress, for example, an increase in the bandwidth overhead due to an excessively small interval setting M. Further, when the data intervals based on the interval setting M are set to the same value as the inter-frame emergency notification interval T1, the worst value of emergency notification delay time can be set to a minimum for practical use.

While the present invention made by its inventors has been described in detail in terms of embodiments, the present invention is not limited to the foregoing embodiments. It is to be understood by those skilled in the art that various modifications can be made without departing from the spirit and scope of the present invention. For example, the foregoing embodiments have been described in detail to facilitate the understanding of the present invention. The present invention is not always limited to embodiments having all the above-described elements. Some elements of a certain embodiment maybe replaced by the elements of another embodiment. Further, the elements of a certain embodiment may be added to the elements of another embodiment. Furthermore, some elements of each embodiment may be deleted, subjected to the addition of other elements, or replaced by other elements.

What is claimed is:

1. A communication system comprising:
   a transmission device that generates a frame compliant with the Ethernet standard and transmits the generated frame to the outside of the transmission device; and
   a reception device that receives the frame transmitted from the transmission device,
   wherein the transmission device inserts first data into the frame at predetermined data intervals,
   wherein the reception device acquires the first data from the received frame at the same data intervals as the transmission device, and acquires the remaining data as data in a header region and payload region of the frame, and
   wherein the predetermined data intervals are set at a value that is not smaller than the sum of the data length of an error detecting code for the frame, the data length of the header region, and the interval between the frame and a neighboring frame.

2. The communication system according to claim 1,
   wherein the transmission device inserts the first data into the payload region of the frame at the predetermined data intervals, and
   wherein the reception device acquires the first data from the payload region of the received frame at the same data intervals as the transmission device.

3. The communication system according to claim 1,
   wherein the transmission device transmits the frame in synchronism with a transmission clock cycle,
   wherein the reception device receives the frame in synchronism with a reception clock cycle,
   wherein the transmission device includes:
      a first buffer that retains second data, the second data being to be stored in a header region and payload region of the frame; and
      a frame generation circuit that chronologically generates the frame while sequentially determining the data in the frame on every transmission clock cycle,
   wherein the frame generation circuit includes:
      a first data counter that cyclically counts the transmission clock cycles at intervals defined by a preset cycle count; and
      a data selection circuit that determines the data in the frame as the second data read from the first buffer when the count of the first data counter is a value other than a first value, and determines the data in the frame as the first data when the count of the first data counter is the first value, and
   wherein the reception device includes:
      a second buffer that retains the second data;
      a second data counter that cyclically counts the reception clock cycles at intervals defined by the same cycle count as the first data counter; and
      a data distribution circuit that writes the data in the frame received on the associated reception clock cycle into the second buffer as the second data when the count of the second data counter is a value other than the first value, and extracts the data in the frame received on the associated reception clock cycle as the first data when the count of the second data counter is the first value.

4. The communication system according to claim 3,
   wherein the first data is more emergent than the second data.

5. The communication system according to claim 3,
   wherein the frame generation circuit in the transmission device further calculates an error detecting code for data outputted from the data selection circuit, and stores the calculated value in an error detecting code region of the frame.

6. The communication system according to claim 3,
   wherein the first data and second data selected by the data selection circuit in the transmission device are both formed of a plurality of bits which are equal in bit width, wherein the frame generation circuit in the transmission device stores a final data flag of a predetermined logic level at a position of one of the bits in the first data on a cycle on which the insertion of the first data is terminated for each frame, and wherein the reception device refrains from extracting the first data from each frame after detecting the final data flag of the predetermined logic level.

7. A semiconductor device comprising:

a transmission circuit that generates a frame compliant with the Ethernet standard and transmits the generated frame to the outside of the transmission circuit, wherein the transmission circuit includes:
  a buffer that retains second data, the second data being to be stored in a header region and payload region of the frame; and
  a frame generation circuit that chronologically generates the frame while sequentially determining the data in the frame on every clock cycle, and wherein the frame generation circuit includes:
  a data counter that cyclically counts the clock cycles at intervals defined by a preset cycle count; and
  a data selection circuit that determines the data in the frame as the second data read from the buffer when the count of the data counter is a value other than a first value, and determines the data in the frame as first data when the count of the data counter is the first value, the first data being different from the second data.

8. The semiconductor device according to claim 7,
wherein the first data is more emergent than the second data.

9. The semiconductor device according to claim 7,
wherein the frame generation circuit further includes an error detecting code calculation circuit that calculates an error detecting code for data outputted from the data selection circuit and stores the calculated value in an error detecting code region of the frame.

10. The semiconductor device according to claim 7,
wherein the data counter starts a counting operation when the second data to be read from the buffer changes from the data in the header region to the data in the payload region.

11. The semiconductor device according to claim 10,
wherein the transmission circuit further includes a data input node and a data valid input node,
wherein the data input node inputs the second data during a predetermined period, and inputs data related to an idle state during a period other than the predetermined period,
wherein the data valid input node inputs a data valid signal that is at a first logic level during the predetermined period and at a second logic level during a period other than the predetermined period,
wherein the buffer includes:
  a first FIFO (First In First Out) buffer that has a capacity for a predetermined number of clock cycles, and acquires the data valid signal at the data valid input node on every clock cycle; and
  a second FIFO buffer that has a capacity for the same number of clock cycles as the first FIFO buffer, and acquires data at the data input node on every clock cycle,
wherein the frame generation circuit further includes a header counter that starts a counting operation when the data valid signal read from the first FIFO buffer changes from the second logic level to the first logic level, and counts the number of clock cycles based on the data length of the header region, and
wherein the data counter starts a counting operation when the header counter completes the counting operation.

12. The semiconductor device according to claim 7,
wherein the first value is a plurality of consecutive counts.

13. The semiconductor device according to claim 7,
wherein the first data and second data selected by the data selection circuit are both formed of a plurality of bits which are equal in bit width, and
wherein the frame generation circuit stores a final data flag of a predetermined logic level at a position of one of the bits in the first data on a cycle on which the insertion of the first data is terminated for each frame.

14. A semiconductor device comprising:
a reception circuit that chronologically receives a frame compliant with the Ethernet standard on every clock cycle,
wherein the reception circuit includes:
  a buffer that retains second data stored in a header region and payload region of the frame; and
  a data counter that cyclically counts the clock cycles at intervals defined by a preset cycle count, and
  a data distribution circuit that writes the data in the frame received on the associated clock cycle into the buffer as the second data when the count of the data counter is a value other than a first value, and extracts the data in the frame received on the associated clock cycle as first data when the count of the data counter is the first value, the first data being different from the second data.

15. The semiconductor device according to claim 14,
wherein the first data is more emergent than the second data.

16. The semiconductor device according to claim 14,
wherein the data counter starts a counting operation when the second data to be distributed by the data distribution circuit changes from the data in the header region to the data in the payload region.

17. The semiconductor device according to claim 16,
wherein the reception circuit further includes a frame data reception node, a data valid reception node, and a header counter,
wherein the frame data reception node receives the frame during a predetermined period and receives data related to an idle state during a period other than the predetermined period,
wherein the data valid reception node receives a data valid signal that is at a first logic level during the predetermined period and at a second logic level during a period other than the predetermined period,
wherein the header counter starts a counting operation when the data valid signal changes from the second logic level to the first logic level, and counts the number of clock cycles based on the data length of the header region, and
wherein the data counter starts a counting operation when the header counter completes the counting operation.

18. The semiconductor device according to claim 17,
wherein the reception circuit further includes:
  a first delay circuit that delays the data valid signal received by the data valid reception node by K cycles and outputs the delayed data valid signal, the K cycles being equivalent to the clock cycles based on the data length of the error detecting code for the frame;

a second delay circuit that delays the frame received by the frame data reception node by the K cycles and outputs the delayed frame; and a mask signal generation circuit that starts outputting a mask signal for the K cycles when the data valid signal received by the data valid reception node shifts from the first logic level to the second logic level, and wherein the data distribution circuit extracts data in the delayed frame as the first data when the count of the data counter is the first value and the mask signal is not outputted, and refrains from extracting the first data when the mask signal is outputted.

* * * * *